United States Patent [19]
Hayakawa

[11] Patent Number: 5,991,091
[45] Date of Patent: Nov. 23, 1999

[54] ZOOM LENS HAVING VIBRATION COMPENSATING FUNCTION

[75] Inventor: Shingo Hayakawa, Yokohama, Japan

[73] Assignee: Canon Kabushiki Kaisha, Tokyo, Japan

[21] Appl. No.: 09/127,032

[22] Filed: Jul. 31, 1998

[30] Foreign Application Priority Data

Aug. 4, 1997 [JP] Japan ................................. 9-221949

[51] Int. Cl.⁶ ............................ G20B 15/14; G20B 27/64
[52] U.S. Cl. ........................................ 359/680; 359/557
[58] Field of Search ................................. 359/554–557, 359/676–692

[56] References Cited

U.S. PATENT DOCUMENTS

| | | | |
|---|---|---|---|
| 5,270,857 | 12/1993 | Oizumi et al. | 359/554 |
| 5,303,087 | 4/1994 | Hayakawa et al. | 359/708 |
| 5,598,299 | 1/1997 | Hayakawa | 359/557 |
| 5,652,678 | 7/1997 | Suzuki et al. | 359/557 |
| 5,774,267 | 6/1998 | Kodama et al. | 359/557 |
| 5,835,272 | 11/1998 | Kodama | 359/557 |
| 5,847,875 | 12/1998 | Kodama | 359/557 |

FOREIGN PATENT DOCUMENTS

| | | |
|---|---|---|
| 60-40605 | 9/1985 | Japan . |
| 63-58326 | 11/1988 | Japan . |
| 2-35406 | 2/1990 | Japan . |
| 8-136862 | 5/1996 | Japan . |

*Primary Examiner*—Georgia Epps
*Assistant Examiner*—David N. Spector
*Attorney, Agent, or Firm*—Fitzpatrick, Cella, Harper & Scinto

[57] ABSTRACT

A standard zoom lens of the negative-lead type having a vibration compensating function includes, in order from an object side to an image side, a first lens unit having a negative refractive power, the first lens unit moving along an optical axis during variation of magnification, a second lens unit having a positive refractive power, the second lens unit moving along the optical axis during variation of magnification, a third lens unit having a positive refractive power, the third lens unit moving along the optical axis during variation of magnification, and a fourth lens unit, the fourth lens unit being stationary during variation of magnification, wherein, when the zoom lens vibrates, the third lens unit is made to make a movement having at least a vector component which is perpendicular to the optical axis to compensate for shaking of an image.

14 Claims, 25 Drawing Sheets

F 3.3

SPHERICAL ABERRATION h=21.6

FIELD CURVATURE·ASTIGMATISM h=21.6

DISTORTION

FIG. 3A  FIG. 3B  FIG. 3C
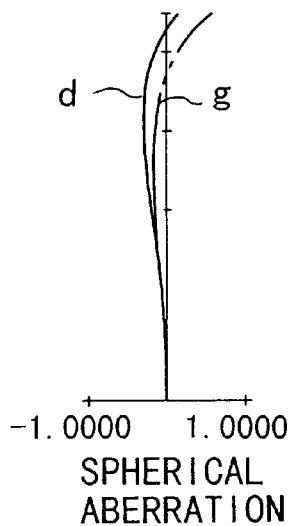
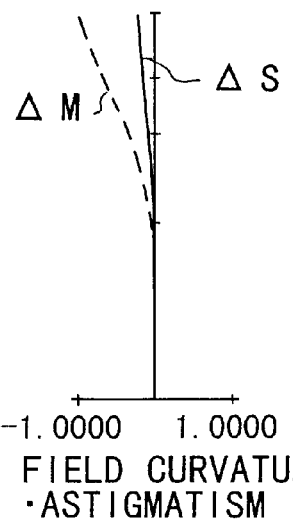
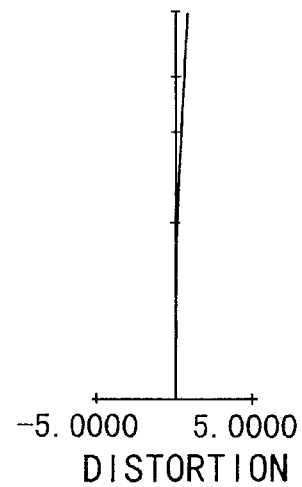
FIG. 3D
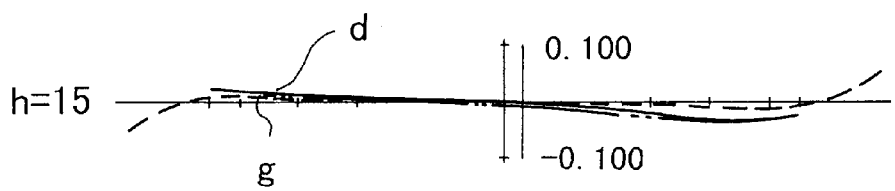
FIG. 3E
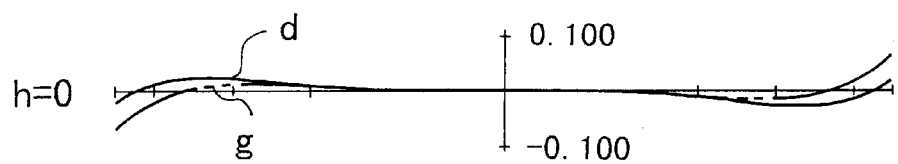

F 5.8

-1.0000   1.0000
SPHERICAL ABERRATION h=21.6

-1.0000   1.0000
FIELD CURVATURE ·ASTIGMATISM h=21.6

-5.0000   5.0000
DISTORTION

FIG. 9A   FIG. 9B   FIG. 9C
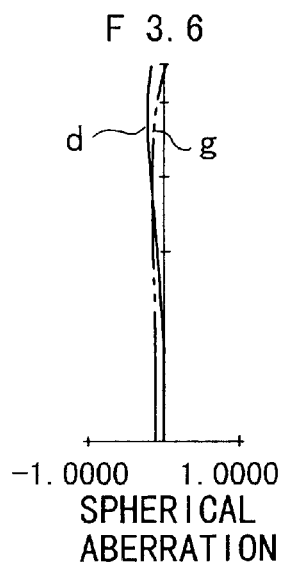
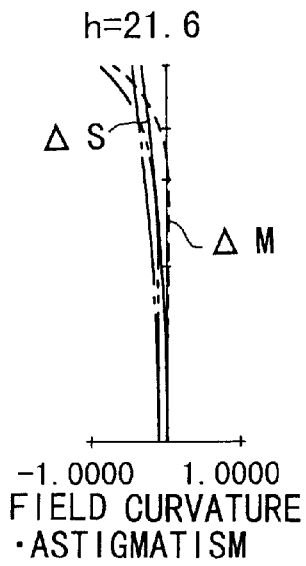
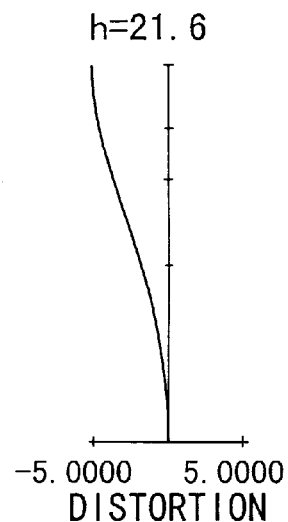
FIG. 9D
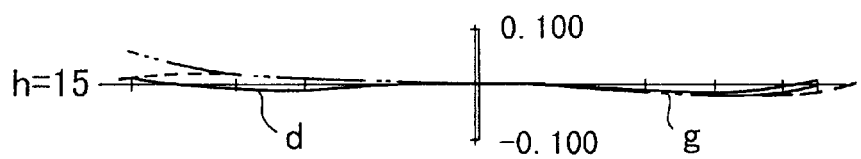
FIG. 9E
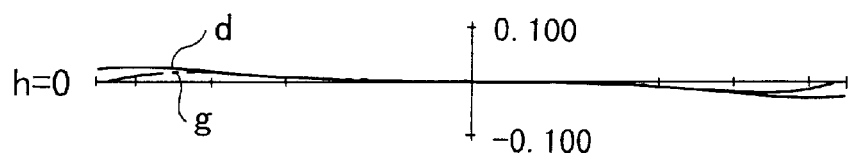

F 4.5 — SPHERICAL ABERRATION h=21.6 — FIELD CURVATURE · ASTIGMATISM h=21.6 — DISTORTION

FIG.24A  FIG.24B  FIG.24C
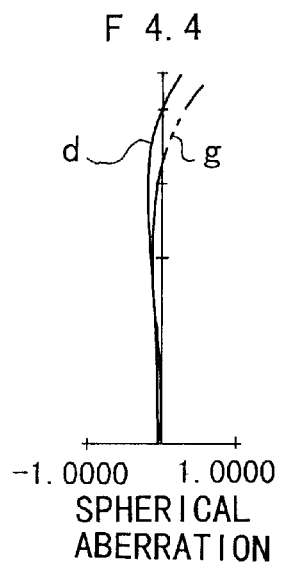
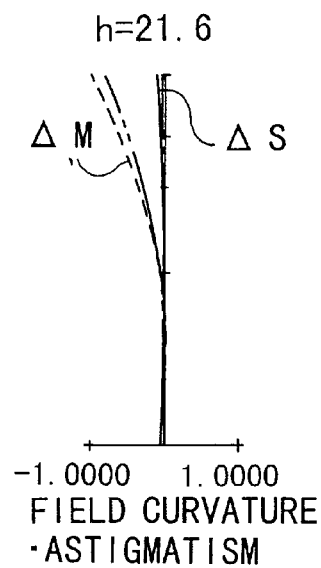
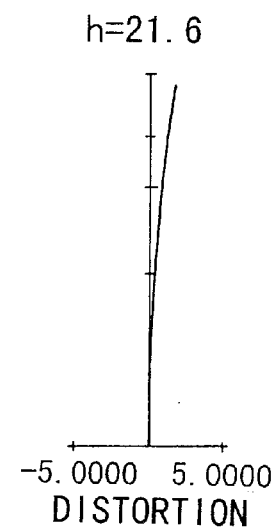
FIG.24D
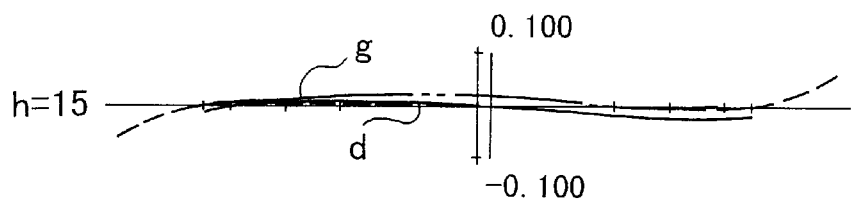
FIG.24E
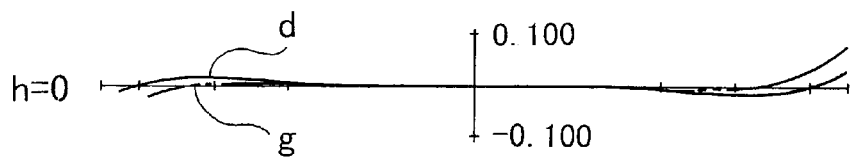

ZOOM LENS HAVING VIBRATION COMPENSATING FUNCTION

BACKGROUND OF THE INVENTION

1. Field of the Invention

The present invention relates to zoom lenses having the vibration compensating function for use in single-lens reflex cameras, video cameras or the like and, more particularly, to a zoom lens whose range of variable magnification is about 3, including favorite focal lengths of from the wide-angle region to a mid-telephoto region and which is constructed in a relatively simple form and has a capability of compensating for shaking of a photographed image caused by accidental vibrations, i.e., the vibration compensating function.

2. Description of Related Art

A great variety of proposals have been made heretofore for the zoom lens whose range contains a focal length equal to the diagonal length of the image frame in the middle region, or the so-called standard zoom lens. Looking only at the construction of the zooming section for variable magnification, a great number of forms, namely, the 2-unit, the 3-unit, 4-unit and the 5-unit forms, are found. These forms of zoom lenses are further classified to two main groups, one of which has a positive lens unit at the most front as viewed from the object side. This positive-lead type is suitable to extend the focal length for the telephoto end with the result of realizing a high range zoom lens. The use of this type, however, tends to increase the number of constituent lens units and also to make complicate the structure of construction of the operating mechanism therefor.

The other group has a negative lens unit at the most front. This negative-lead type, on the other hand, though hardly increasing the focal length for the telephoto end to a very large value, is suited to shorten the focal length for the wide-angle end, that is, to realize either a wide-angle zoom lens, or a standard zoom lens in a relatively simple form.

For such a negative-lead type zoom lens, too, there have so far been made many previous proposals. In particular, with the use of lens units constructed in the 3-unit or 4-unit form, standard zoom lenses corrected well for all the aberrations are realized as disclosed in, for example, Japanese Patent publications No. Sho 60-40605 and No. Sho 63-58326.

In Japanese Patent publication No. Sho 60-40605, the standard zoom lens comprises, in order from an object side, a first lens unit of negative refractive power, a second lens unit of positive refractive power and a third lens unit of positive or negative refractive power. This 3-unit form of standard zoom lens aims mainly at a zoom ratio of 2 or thereabout.

In Japanese Patent publication No. Sho 63-58326, the standard zoom lens comprises, in order from an object side, a first lens unit of negative refractive power, a second lens unit of positive refractive power, a third lens unit of positive refractive power and a fourth lens unit of negative refractive power. This 4-unit form of standard zoom lens aims mainly to increase the zoom ratio to 3 weak.

Meanwhile, as one of zoom lenses having the mechanism for compensating for shaking of a photographed image caused by accidental vibrations during the time when taking a shot, there has been proposed a zoom lens capable of compensating for vibrations by shifting certain of lens units constituting an optical system in directions nearly perpendicular to the optical axis, as disclosed in, for example, Japanese Laid-Open Patent Applications No. Hei 2-35406 and No. Hei 8-136862.

The above Japanese Laid-Open Patent Application No. Hei 2-35406 discloses an example of application of the zoom lens as is suited mainly to leaf shutter cameras. The zoom lens cited here is of the 3-unit form, comprising, in order from an object side, a first lens unit of negative refractive power, a second lens unit of positive refractive power and a third lens unit of negative refractive power. Out of these lens units, the third lens unit is selected to be used in moving in the directions nearly perpendicular to the optical axis, to compensate for shaking of a photographed image.

The above Japanese Laid-Open Patent Application No. Hei 8-136862 discloses another example of application which is suited mainly to the standard zoom lens for the single-lens reflex camera. The zoom lens in the 4-unit form, comprises, in order from an object side, a first lens unit of positive refractive power, a second lens unit of negative refractive power, a third lens unit of positive refractive power and a fourth lens unit of positive refractive power. The second lens unit is made to move in the directions nearly perpendicular to the optical axis, thus compensating for shaking of a photographed image.

In general, the optical systems which make the vibration compensating provision in part or one lens unit thereof by parallel decentering in the directions perpendicular to the optical axis have such an advantage that no more optical part such as a variable angle prism is necessary to use for the purpose of compensating for vibrations, but suffer a problem that, when compensating for vibrations, a larger amount of decentering aberrations is produced.

Further, in the case of application of such a vibration compensating method to, for example, the standard zoom lens, the requirement of retaining good correction of all aberrations even in the vibration compensating state must be fulfilled simultaneously with the requirement of minimizing the bulk and size of the photographing apparatus. So, another problem arises in that more appropriate features or conditions must be set forth for certain optical parameters such as the refractive powers of all the lens units and the power distribution than when the vibration compensating function is not in use.

BRIEF SUMMARY OF THE INVENTION

The invention is to compensate for shaking of a photographed image when the zoom lens vibrates (or tilts). For this purpose, one lens unit constituting part of the zoom lens is made to move in such a way that the vector of motion contains at least that component which is perpendicular to an optical axis. On this premise, appropriate rules of design for the refractive powers of the lens units, the power distribution and others are set forth to maintain good stability of optical performance throughout the entire zooming range despite the construction in a relatively simple form. In addition, even when a mechanism for compensating for vibrations is installed, it is made possible to minimize the bulk and size of the entire apparatus. Further, even when compensating for vibrations, the quality of the image can be kept good. It is, therefore, an object of the invention to provide a vibration-compensated zoom lens having a high optical performance in a compact form.

To attain the above object, in accordance with an aspect of the invention, there is provided a zoom lens having a vibration compensating function, which comprises, in order from an object side to an image side, a first lens unit having a negative refractive power, the first lens unit moving along an optical axis during variation of magnification, a second lens unit having a positive refractive power, the second lens unit moving along the optical axis during variation of magnification, a third lens unit having a positive refractive power, the third lens unit moving along the optical axis during variation of magnification, and a fourth lens unit, the fourth lens unit being stationary during variation of magnification, wherein, when the zoom lens vibrates, the third lens unit is made to make a movement having at least a vector component which is perpendicular to the optical axis to compensate for shaking of an image.

In accordance with another aspect of the invention, there is provided a zoom lens having a vibration compensating function, which comprises, in order from an object side to an image side, a first lens unit having a negative refractive power, the first lens unit moving along an optical axis during variation of magnification, a second lens unit having a positive refractive power, the second lens unit moving along the optical axis during variation of magnification, and a third lens unit, the third lens unit being stationary during variation of magnification, wherein, when the zoom lens vibrates, a part of the second lens unit is made to make a movement having at least a vector component which is perpendicular to the optical axis to compensate for shaking of an image.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 3A to 3E are graphic representations of the aberrations of the numerical example 1 in a middle focal length position in the normal state.

FIGS. 9A to 9E are graphic representations of the aberrations of the numerical example 2 in the wide-angle end in the normal state.

FIGS. 24A to 24E are graphic representations of the aberrations of the numerical example 4 in a middle focal length position in the normal state.

DETAILED DESCRIPTION OF THE INVENTION

Figure 1A:
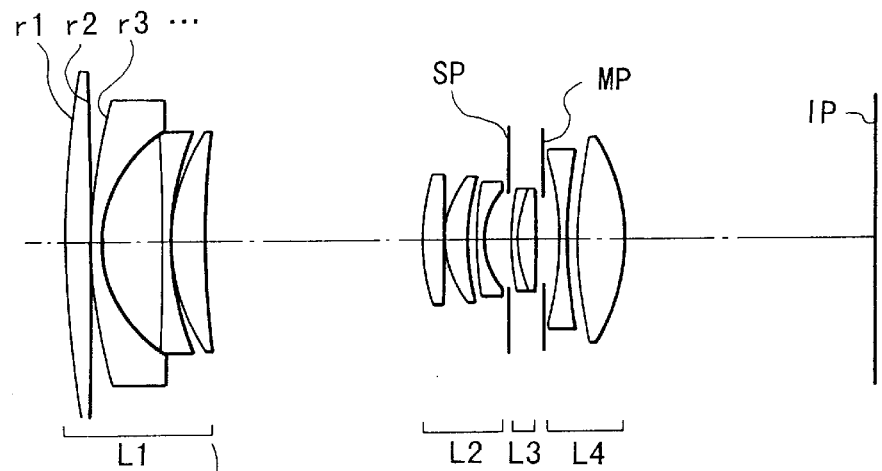
FIGS. 1A to 1C are longitudinal section views of a numerical example 1 of the zoom lens in different operative positions.
Figure 1B:
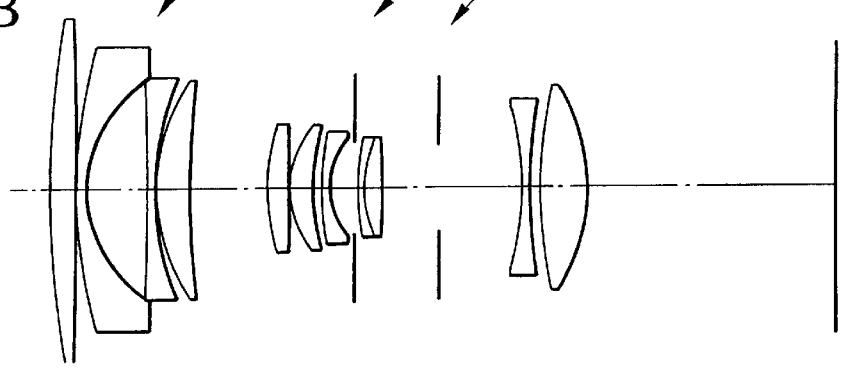
Figure 1C:
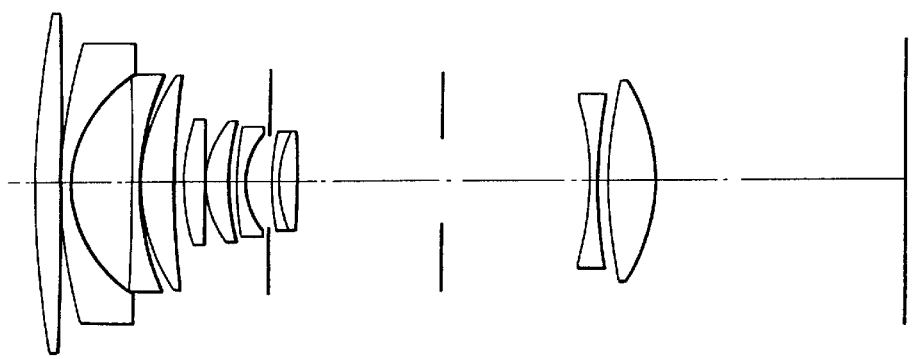
Figure 2A:
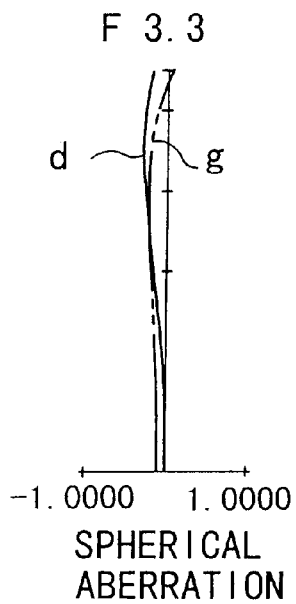
FIGS. 2A to 2E are graphic representations of the aberrations of the numerical example 1 in the wide-angle end in the normal state.
Figure 2B:
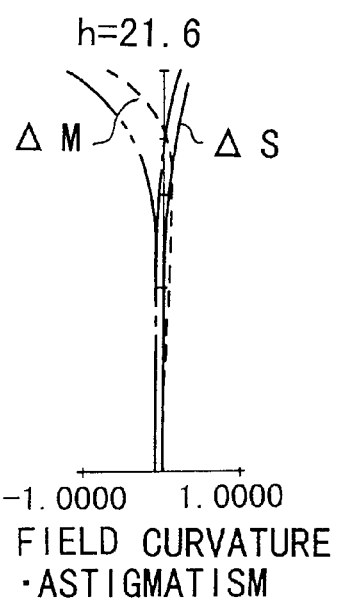
Figure 2C:
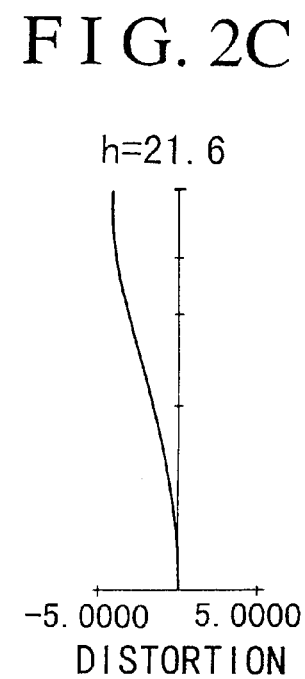
Figure 2D:
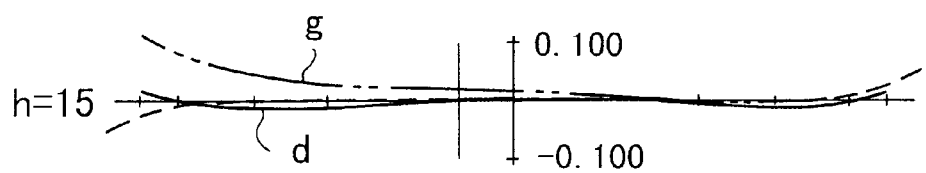
Figure 2E:
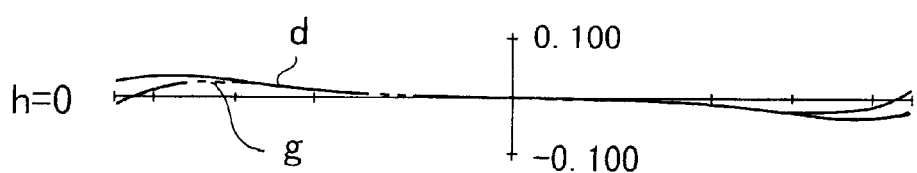
Figure 4A:
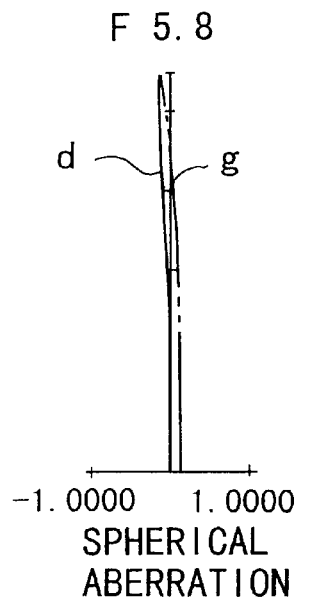
FIGS. 4A to 4E are graphic representations of the aberrations of the numerical example 1 in the telephoto end in the normal state.
Figure 4B:
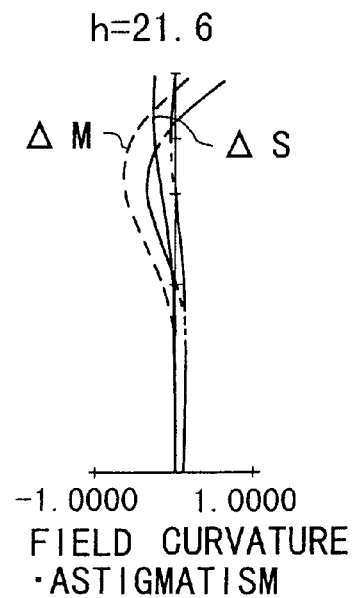
Figure 4C:
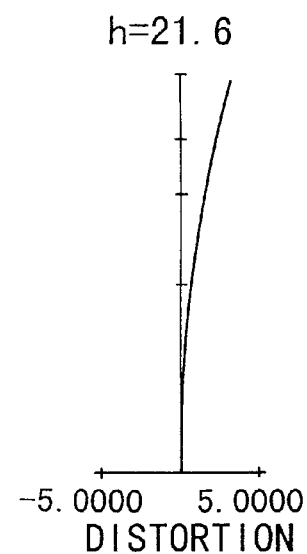
Figure 4D:
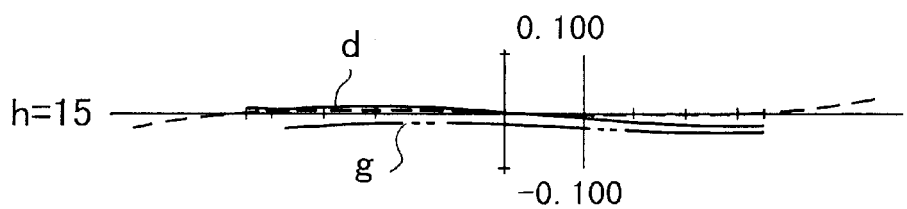
Figure 4E:
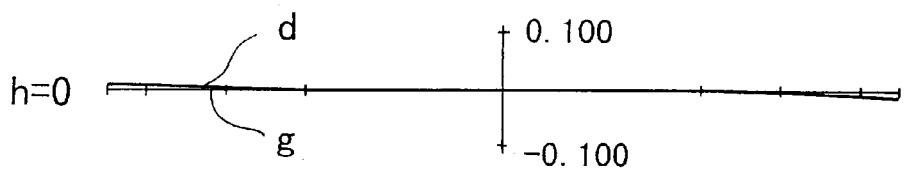
Figure 5A:
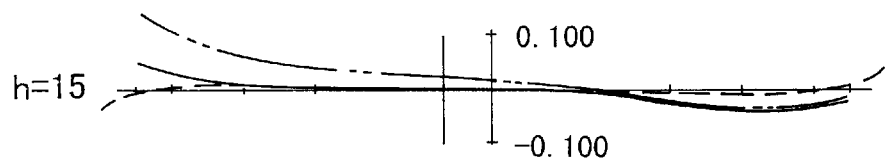
FIGS. 5A to 5C are graphic representations of the aberrations of the numerical example 1 in the wide-angle end in the vibration compensating state.
Figure 5B:
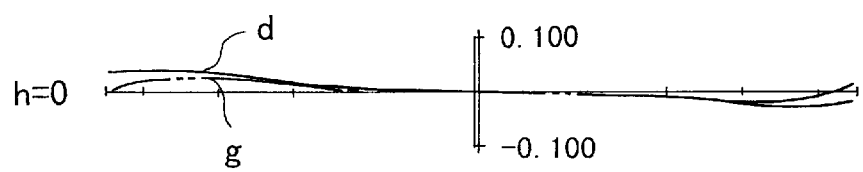
Figure 5C:
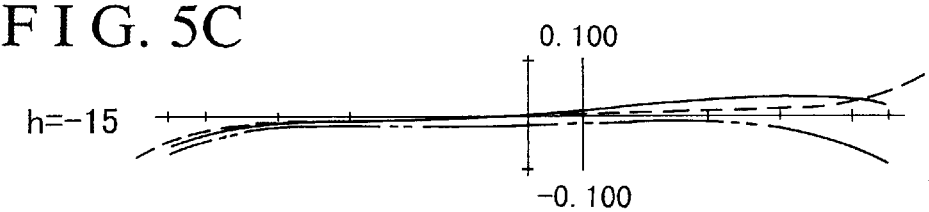
Figure 6A:
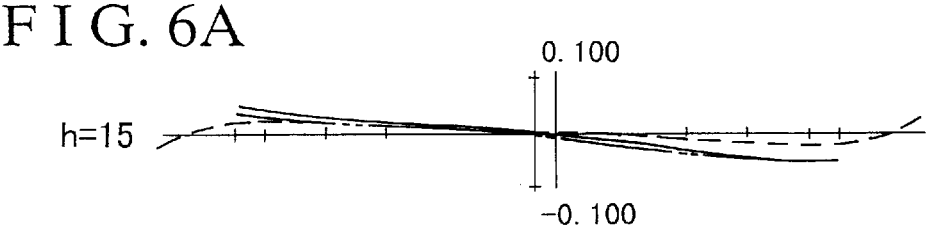
FIGS. 6A to 6C are graphic representations of the aberrations of the numerical example 1 in a middle focal length position in the vibration compensating state.
Figure 6B:
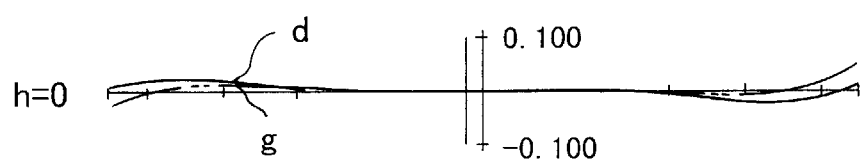
Figure 6C:
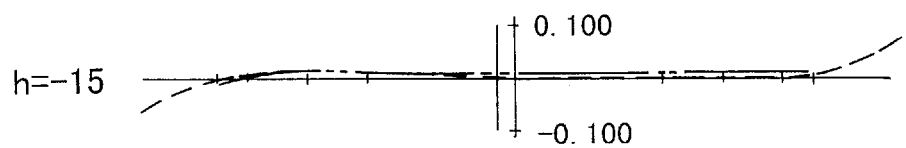
Figure 7A:
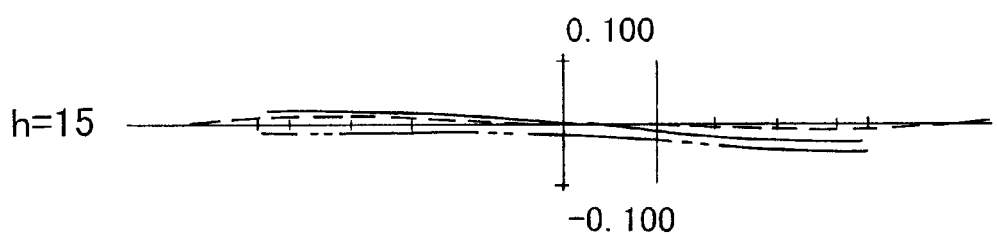
FIGS. 7A to 7C are graphic representations of the aberrations of the numerical example 1 in the telephoto end in the vibration compensating state.
Figure 7B:
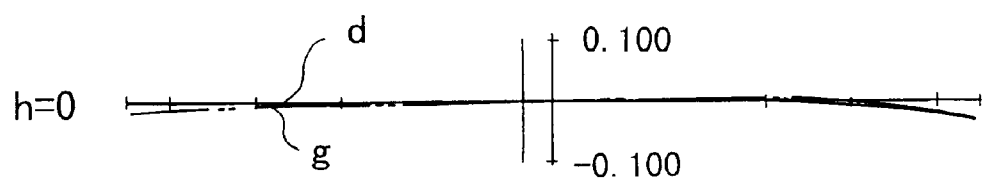
Figure 7C:
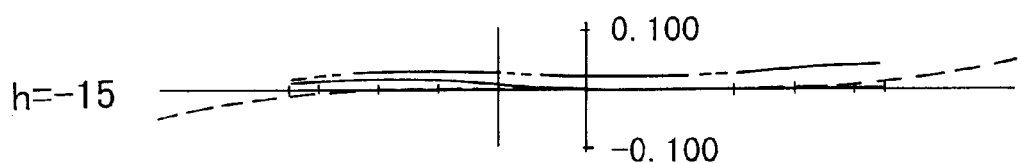
Figure 8A:
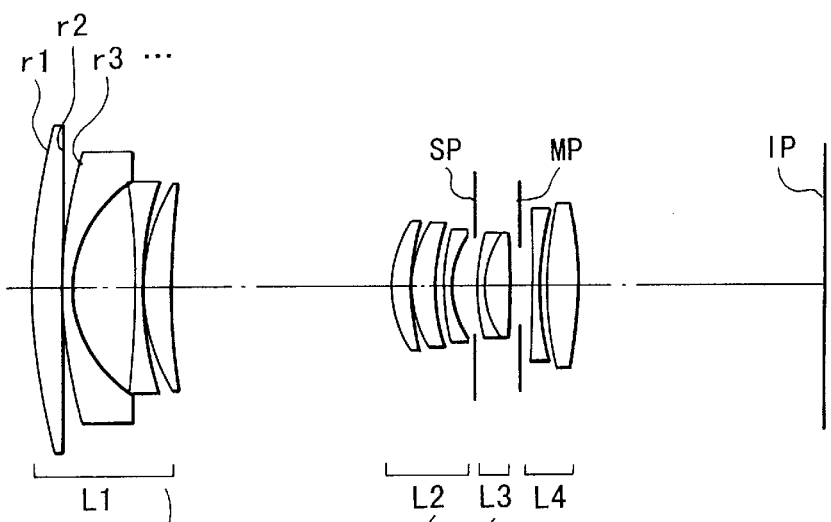
FIGS. 8A to 8C are longitudinal section views of a numerical example 2 of the zoom lens in different operative positions.
Figure 8B:
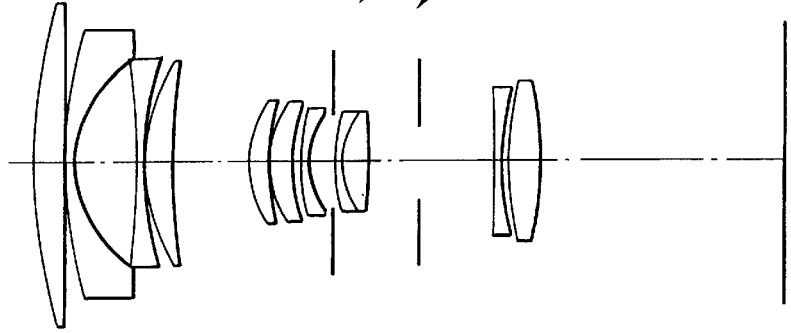
Figure 8C:
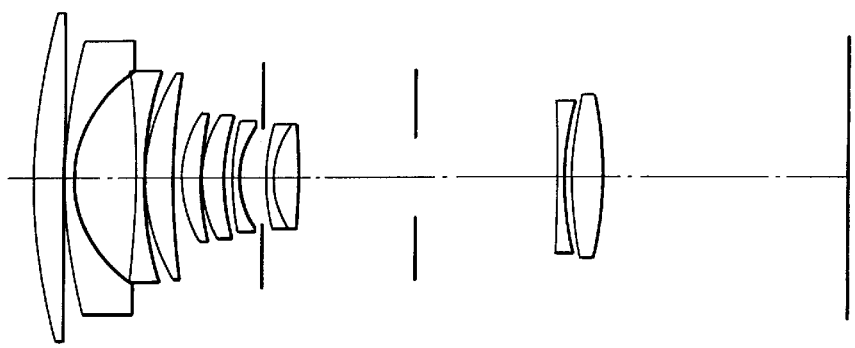
Figures 10A, 10B, 10C:
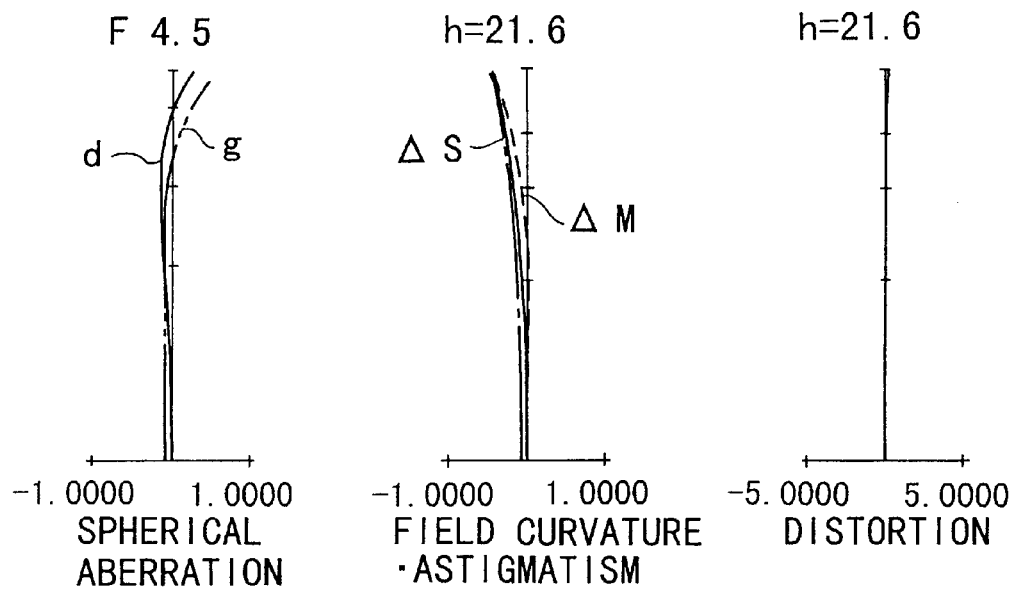
FIGS. 10A to 10E are graphic representations of the aberrations of the numerical example 2 in a middle focal length position in the normal state.
Figure 10D:
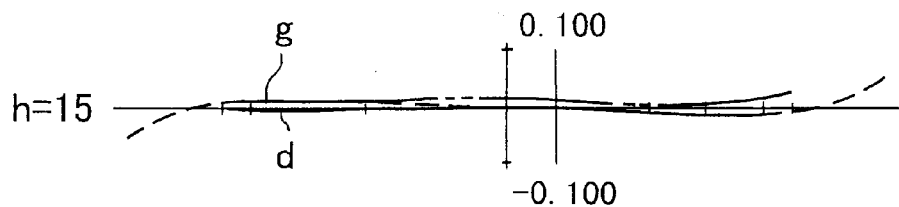
Figure 10E:
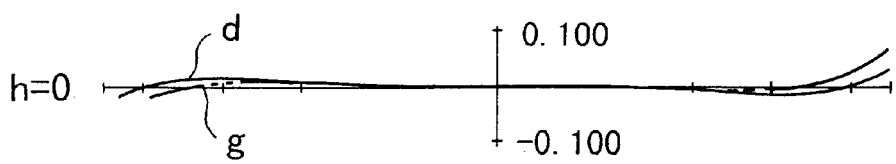
Figures 11A, 11B, 11C:
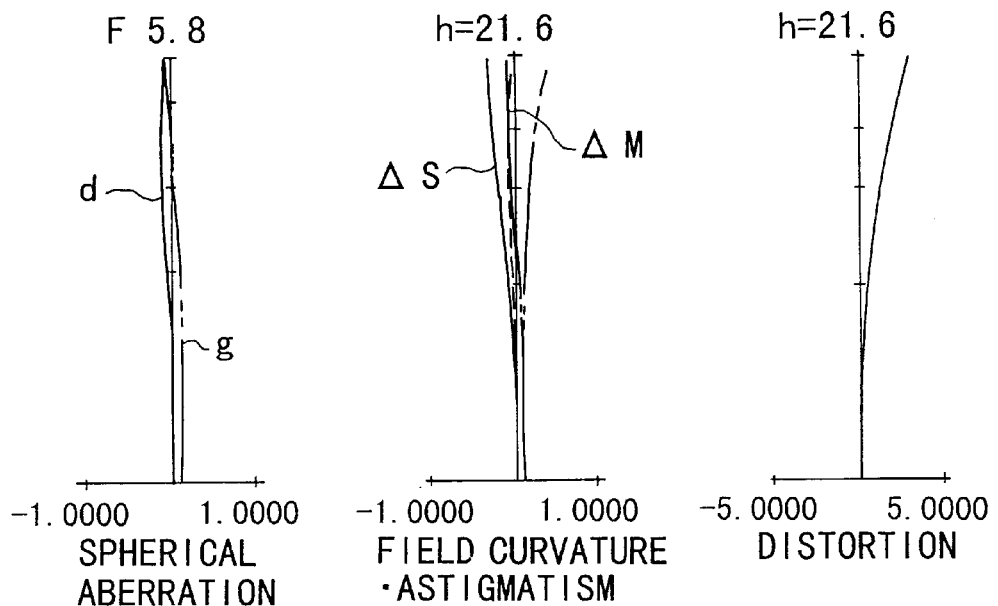
FIGS. 11A to 11E are graphic representations of the aberrations of the numerical example 2 in the telephoto end in the normal state.
Figure 11D:
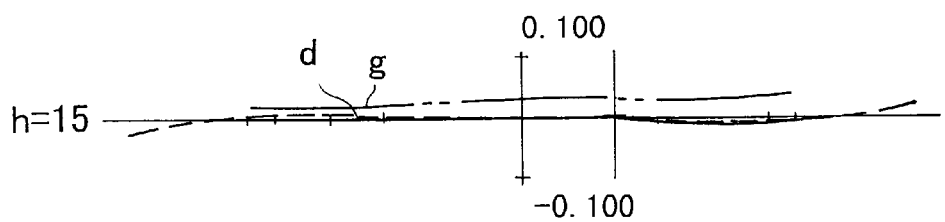
Figure 11E:
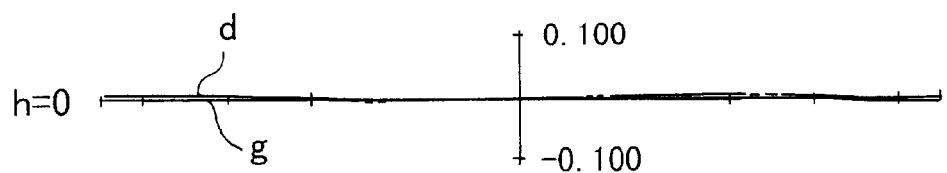
Figure 12A:
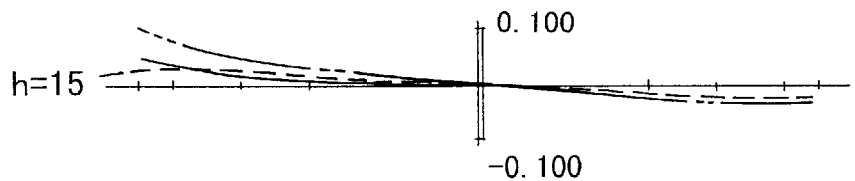
FIGS. 12A to 12C are graphic representations of the aberrations of the numerical example 2 in the wide-angle end in the vibration compensating state.
Figure 12B:
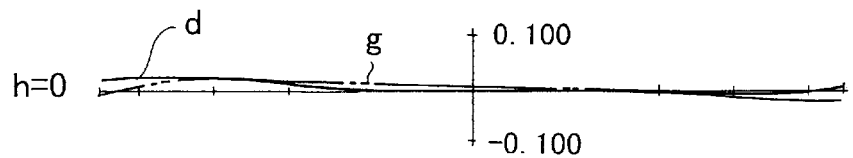
Figure 12C:
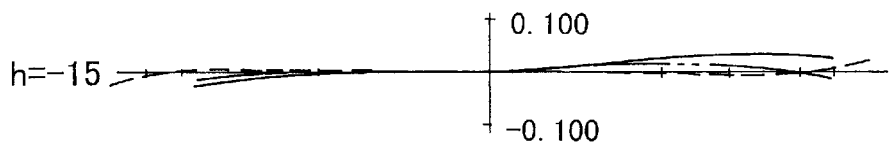
Figure 13A:
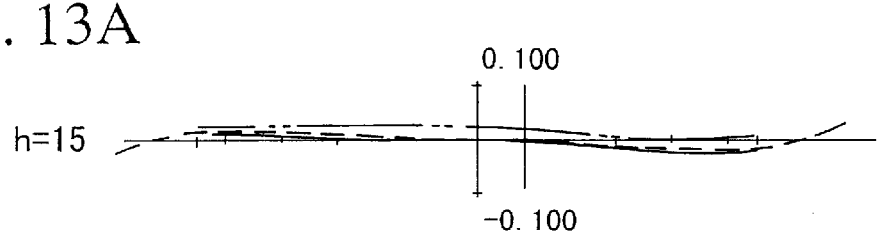
FIGS. 13A to 13C are graphic representations of the aberrations of the numerical example 2 in a middle focal length position in the vibration compensating state.
Figure 13B:
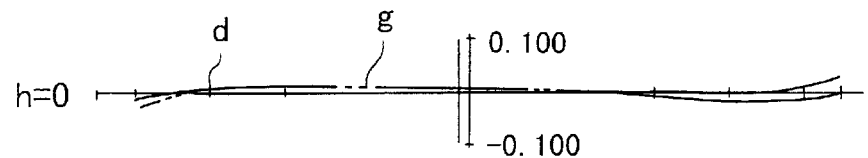
Figure 13C:
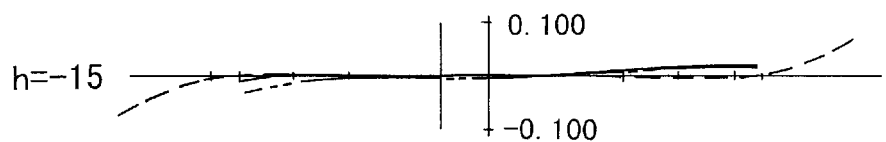
Figure 14A:
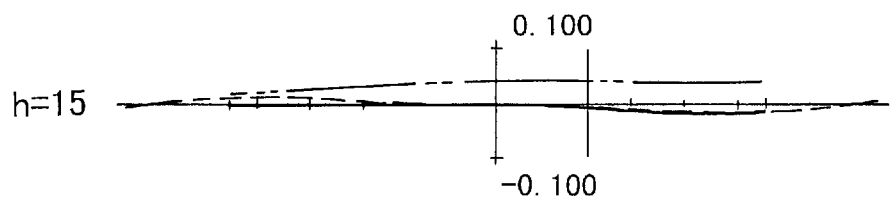
FIGS. 14A to 14C are graphic representations of the aberrations of the numerical example 2 in the telephoto end in the vibration compensating state.
Figure 14B:
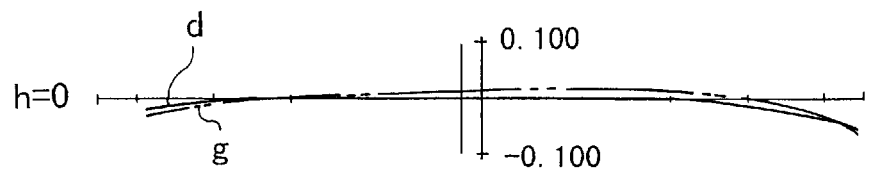
Figure 14C:
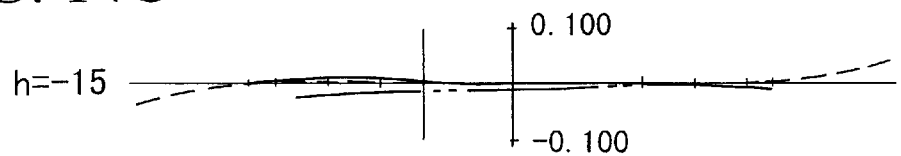
Figure 15A:
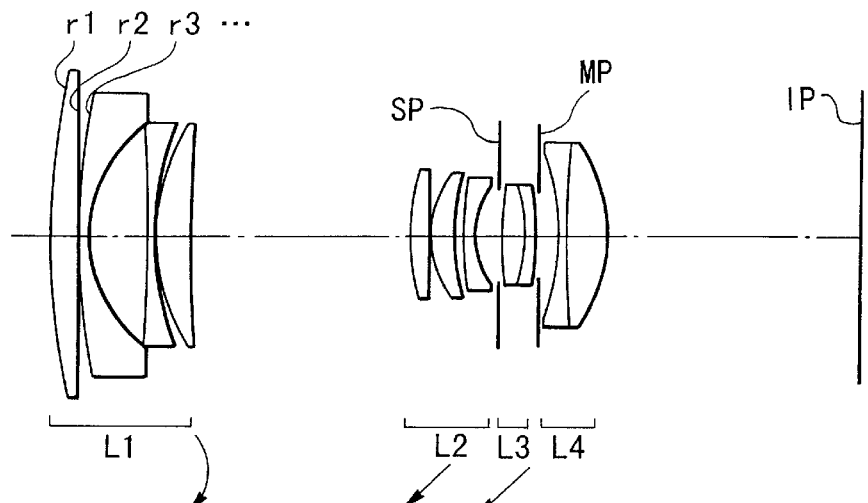
FIGS. 15A to 15C are longitudinal section views of a numerical example 3 of the zoom lens in different operative positions.
Figure 15B:
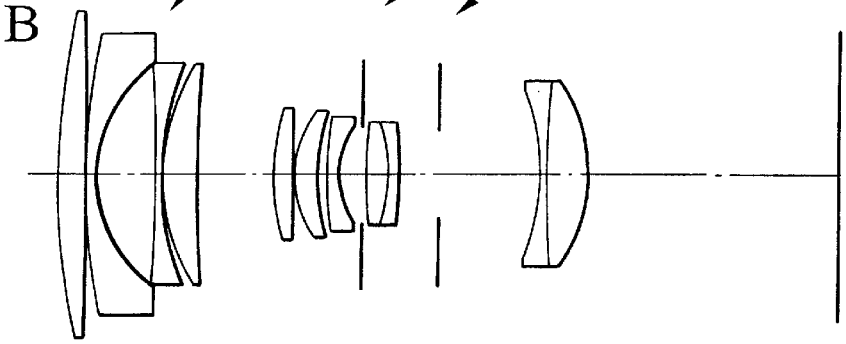
Figure 15C:
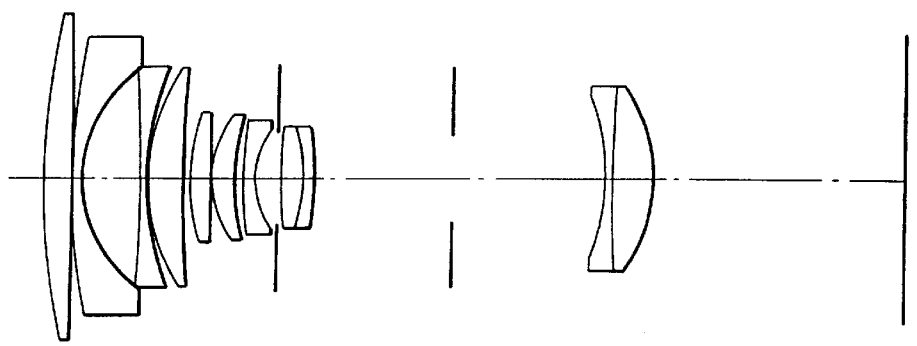
Figures 16A, 16B, 16C:
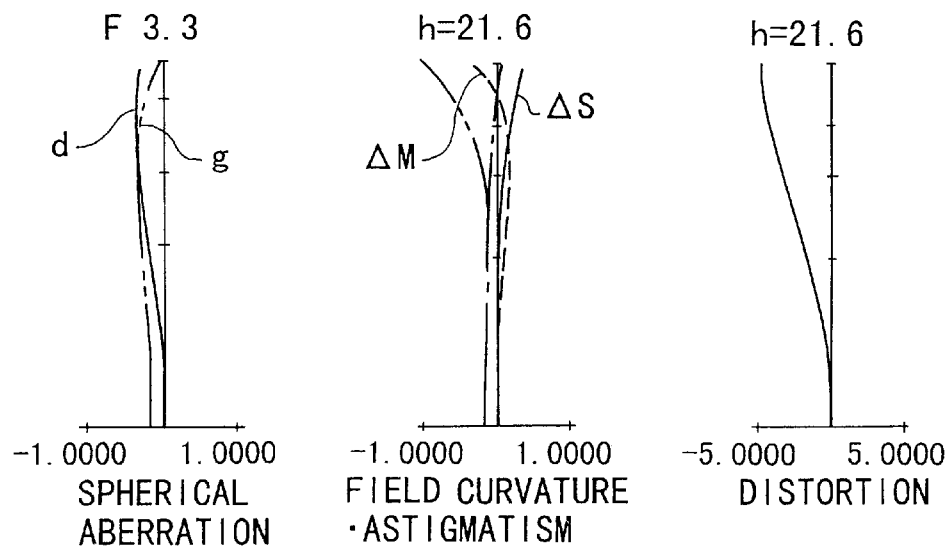
FIGS. 16A to 16E are graphic representations of the aberrations of the numerical example 3 in the wide-angle end in the normal state.
Figure 16D:
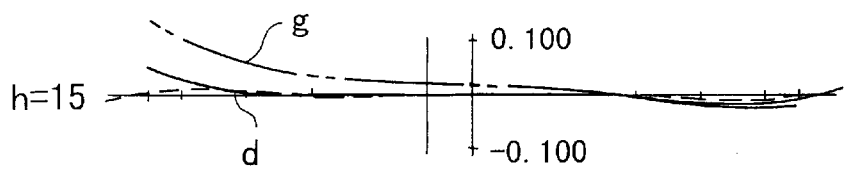
Figure 16E:
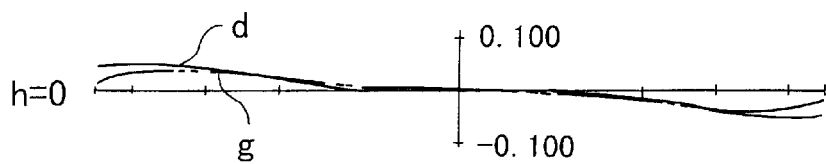
Figures 17A, 17B, 17C:
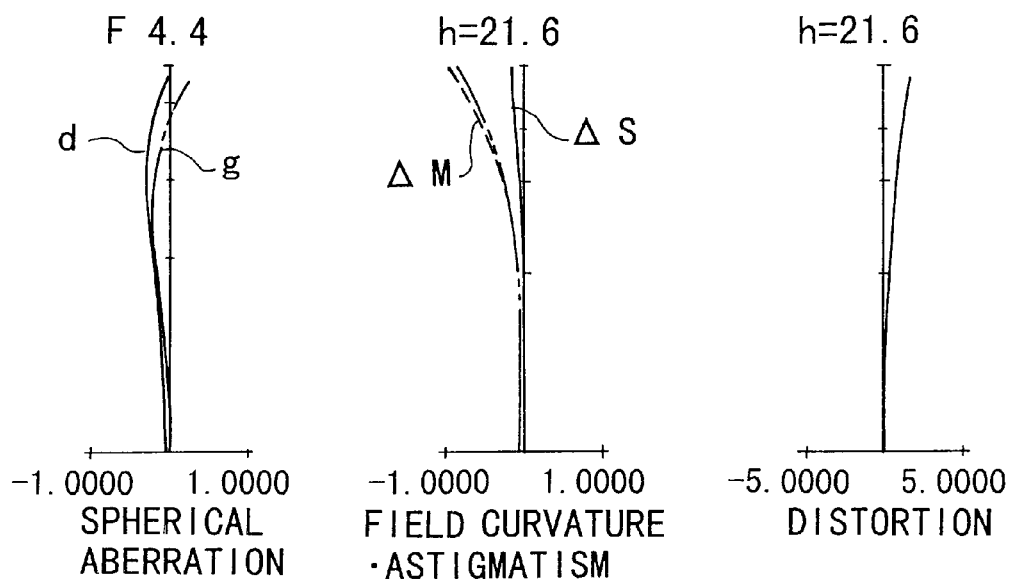
FIGS. 17A to 17E are graphic representations of the aberrations of the numerical example 3 in a middle focal length position in the normal state.
Figure 17D:
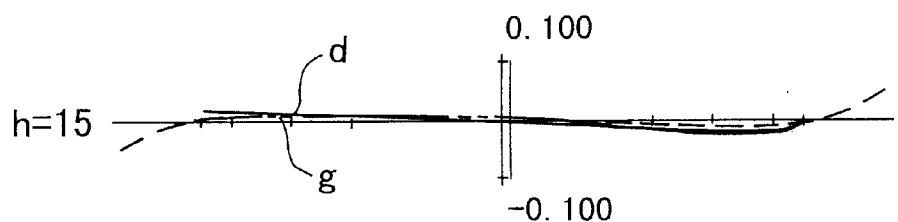
Figure 17E:
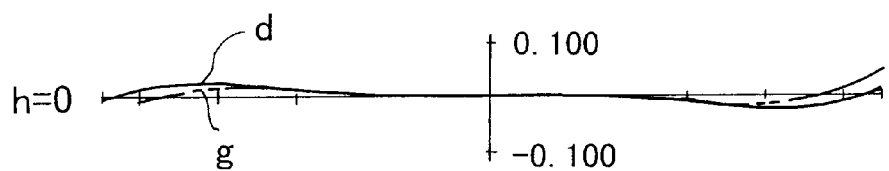
Figures 18A, 18B, 18C:
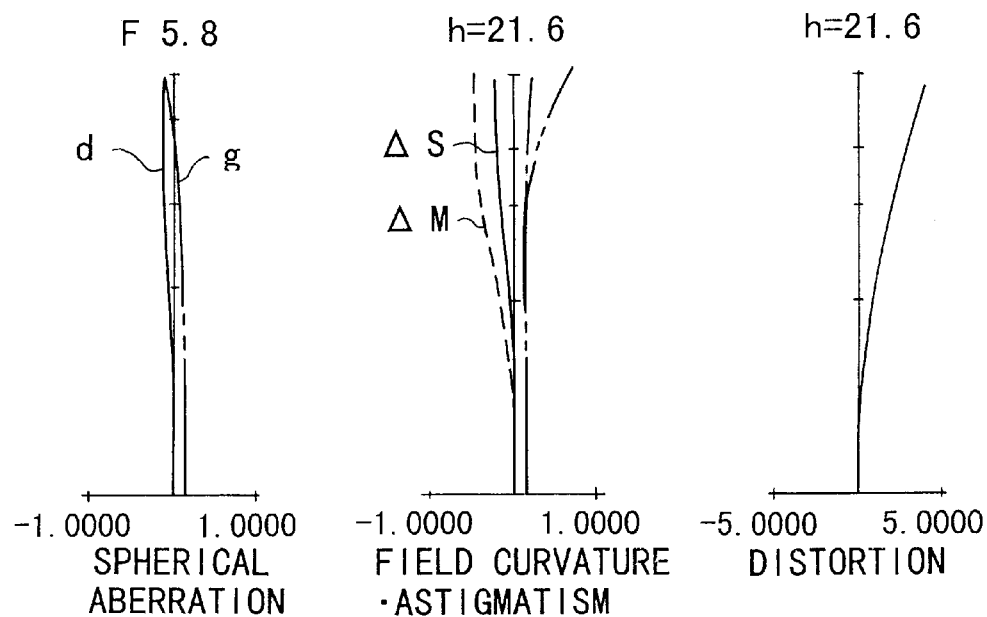
FIGS. 18A to 18E are graphic representations of the aberrations of the numerical example 3 in the telephoto end in the normal state.
Figure 18D:
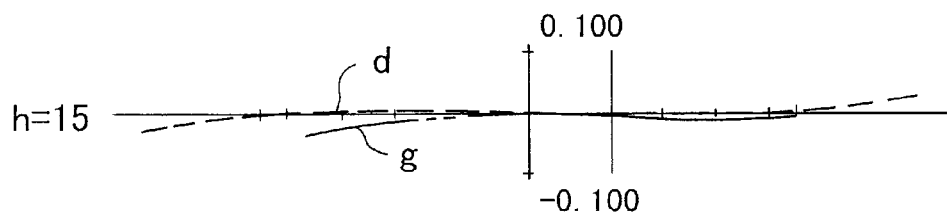
Figure 18E:
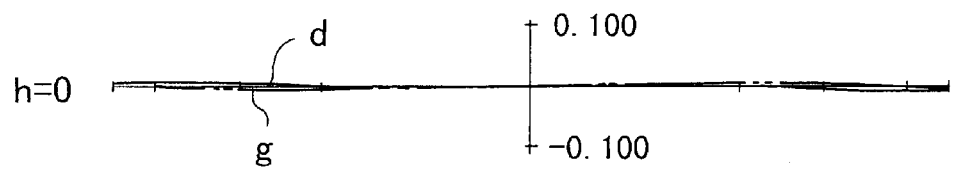
Figure 19A:
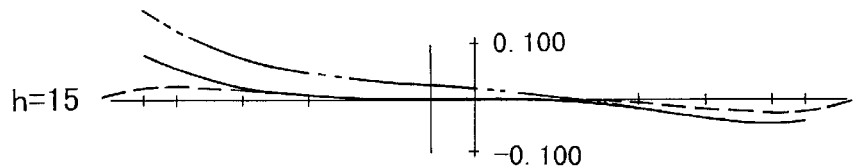
FIGS. 19A to 19C are graphic representations of the aberrations of the numerical example 3 in the wide-angle end in the vibration compensating state.
Figure 19B:
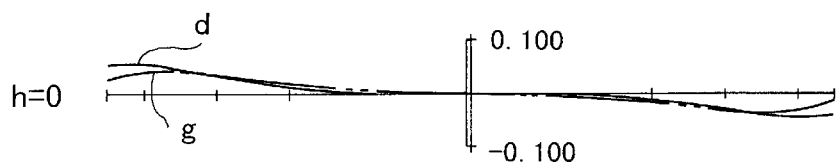
Figure 19C:
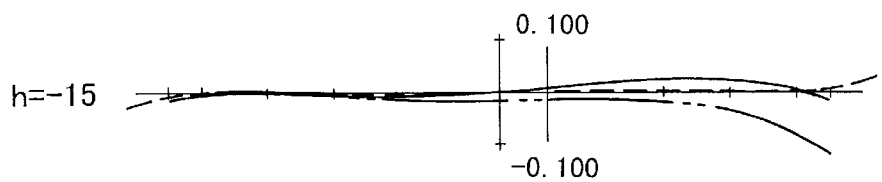
Figure 20A:
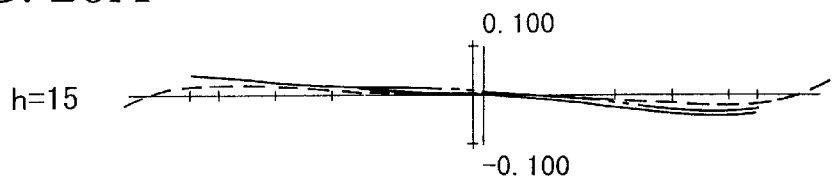
FIGS. 20A to 20C are graphic representations of the aberrations of the numerical example 3 in a middle focal length position in the vibration compensating state.
Figure 20B:
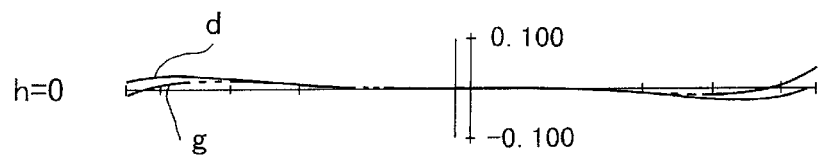
Figure 20C:
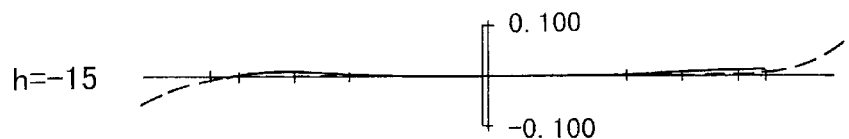
Figure 21A:
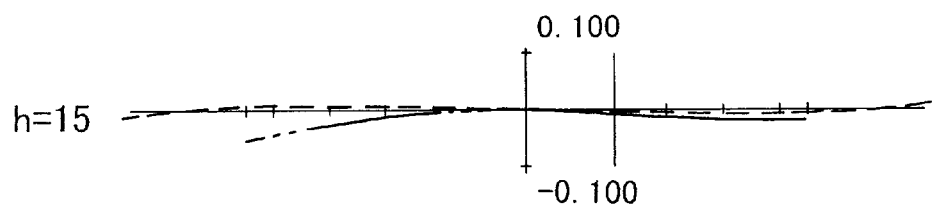
FIGS. 21A to 21C are graphic representations of the aberrations of the numerical example 3 in the telephoto end in the vibration compensating state.
Figure 21B:
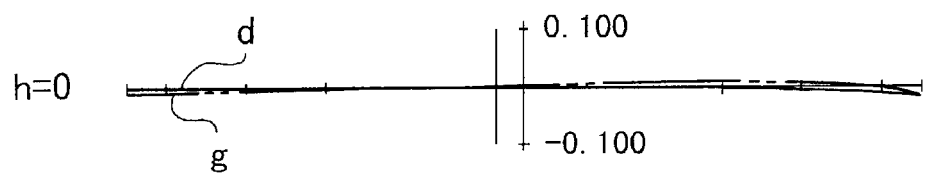
Figure 21C:
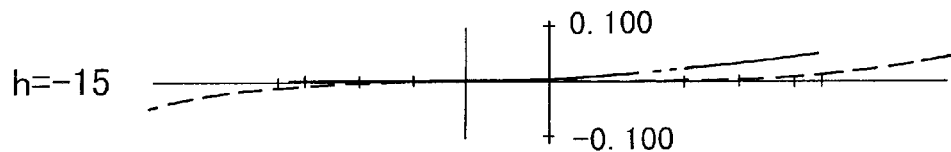
Figure 22A:
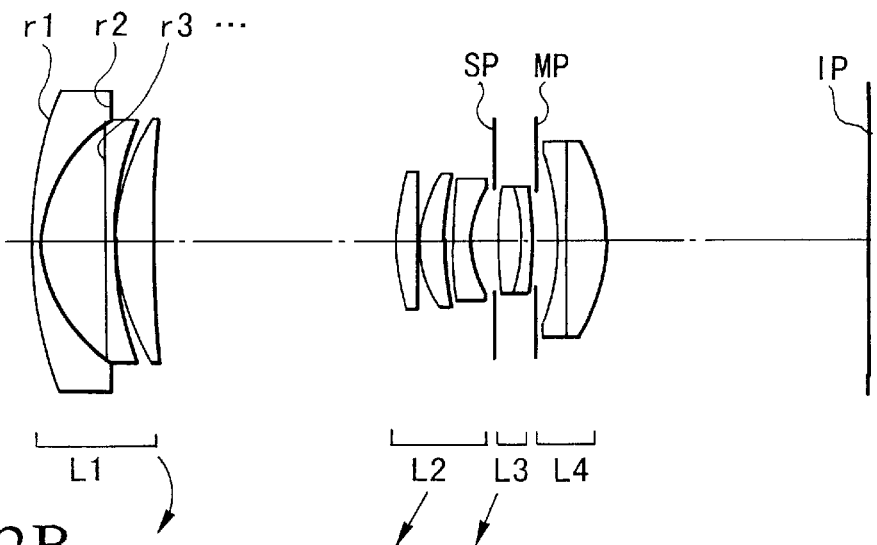
FIGS. 22A to 22C are longitudinal section views of a numerical example 4 of the zoom lens in different operative positions.
Figure 22B:
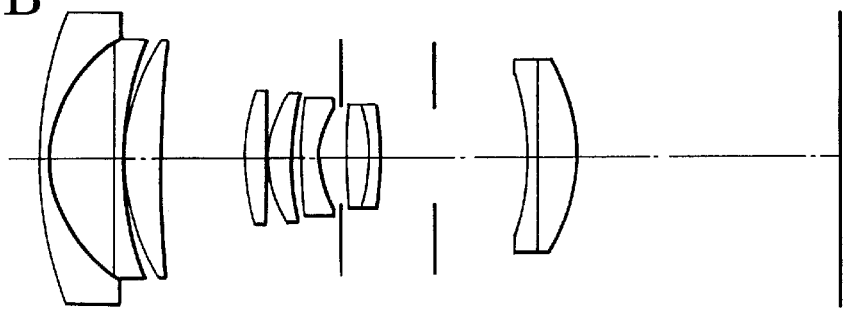
Figure 22C:
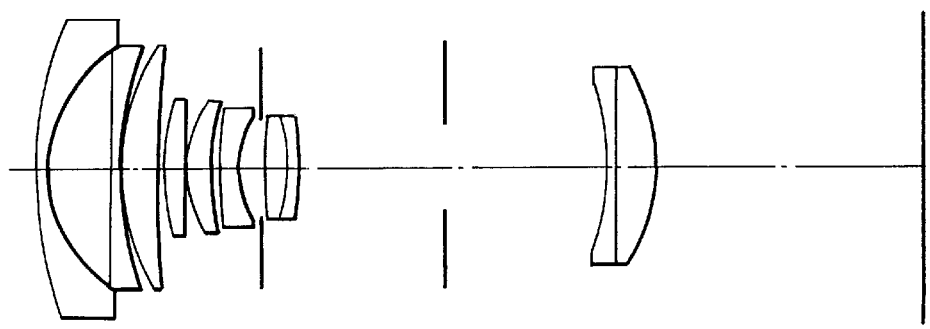
Figures 23A, 23B, 23C:
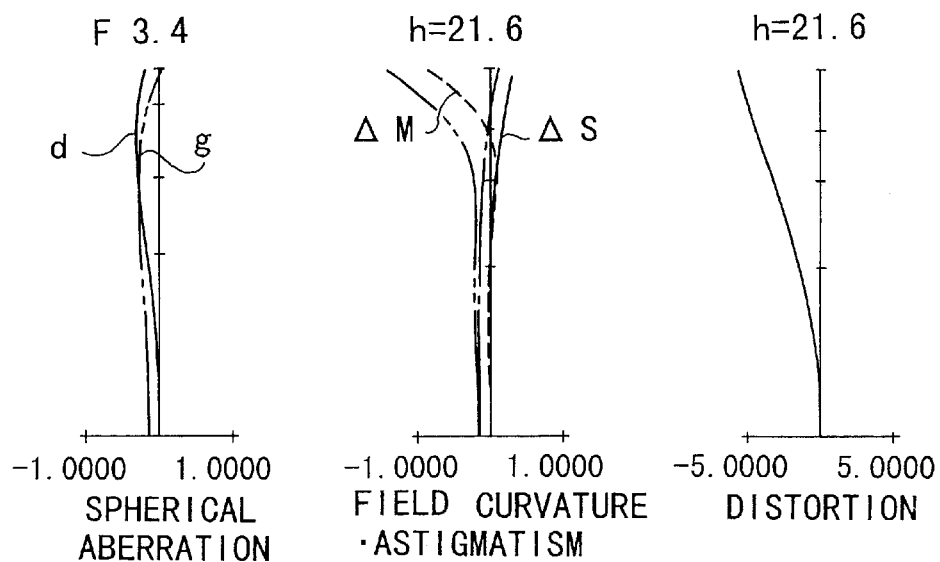
FIGS. 23A to 23E are graphic representations of the aberrations of the numerical example 4 in the wide-angle end in the normal state.
Figure 23D:
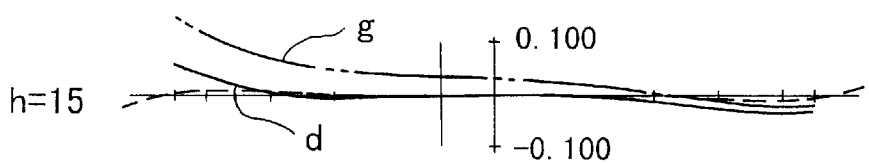
Figure 23E:
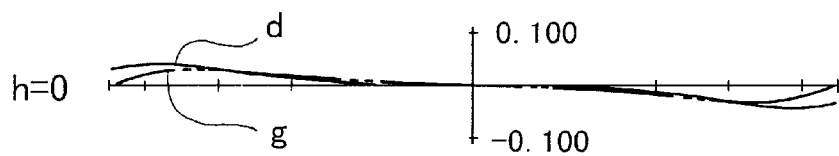
Figures 25A, 25B, 25C:
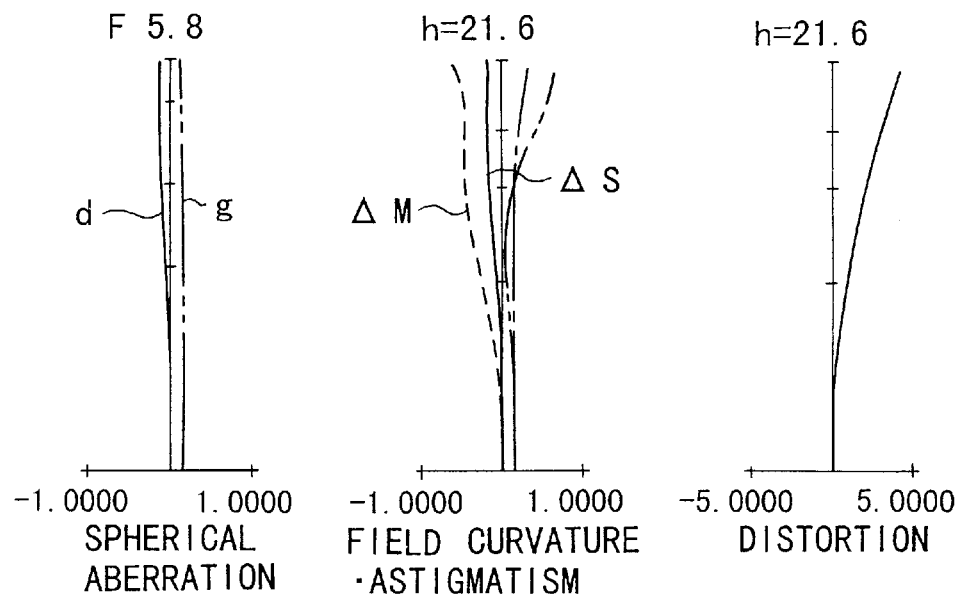
FIGS. 25A to 25E are graphic representations of the aberrations of the numerical example 4 in the telephoto end in the normal state.
Figure 25D:
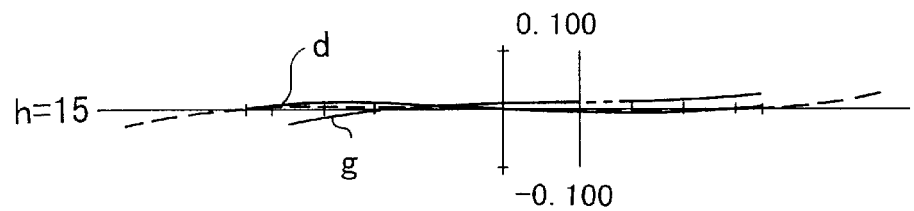
Figure 25E:
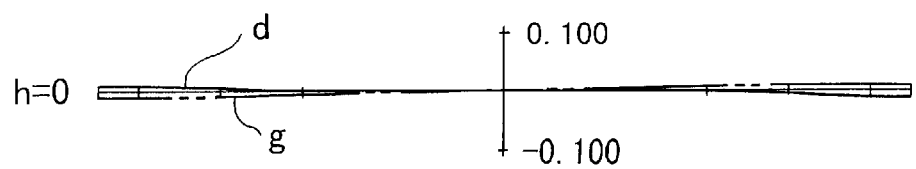
Figure 26A:
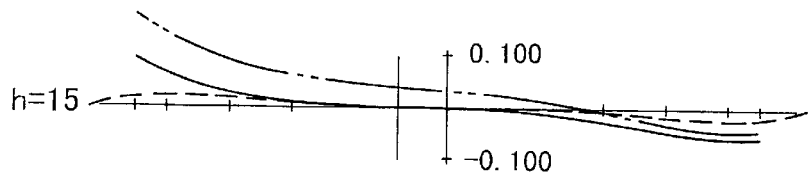
FIGS. 26A to 26C are graphic representations of the aberrations of the numerical example 4 in the wide-angle end in the vibration compensating state.
Figure 26B:
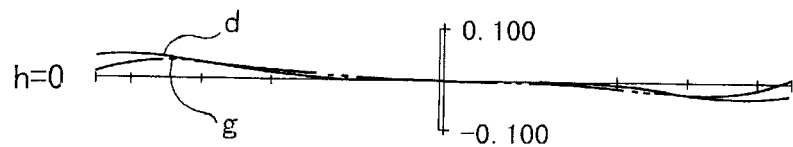
Figure 26C:
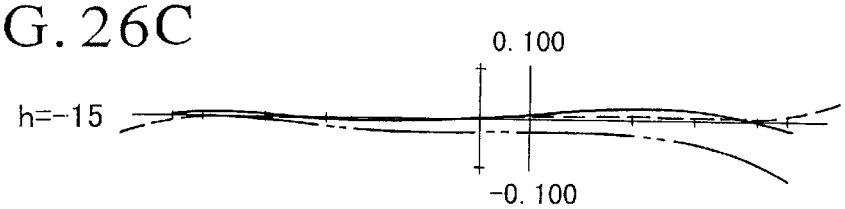
Figure 27A:
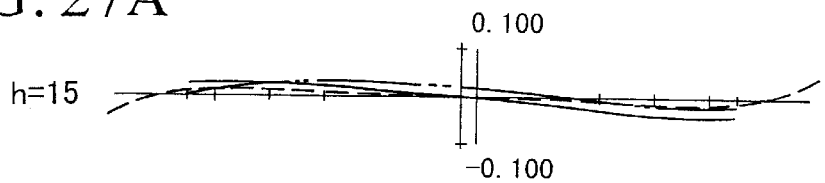
FIGS. 27A to 27C are graphic representations of the aberrations of the numerical example 4 in a middle focal length position in the vibration compensating state.
Figure 27B:
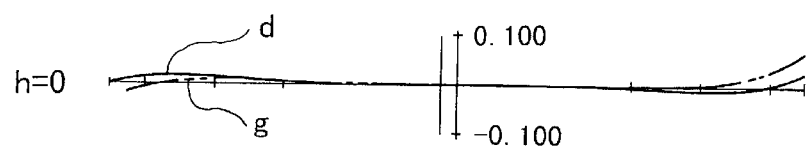
Figure 27C:
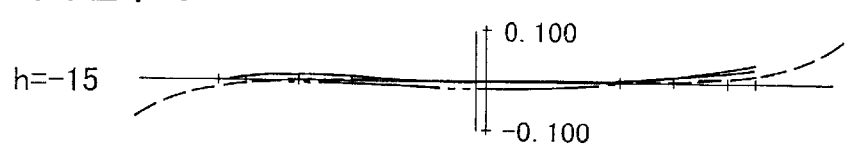
Figure 28A:
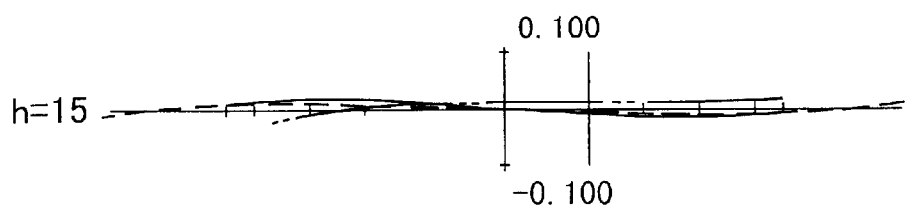
FIGS. 28A to 28C are graphic representations of the aberrations of the numerical example 4 in the telephoto end in the vibration compensating state.
Figure 28B:
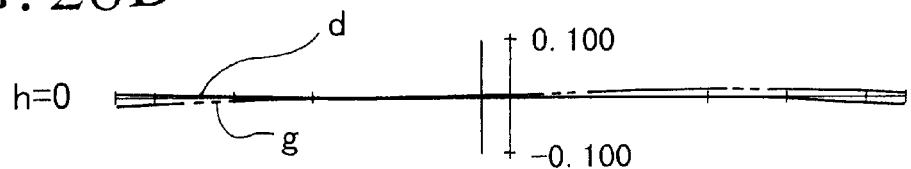
Figure 28C:
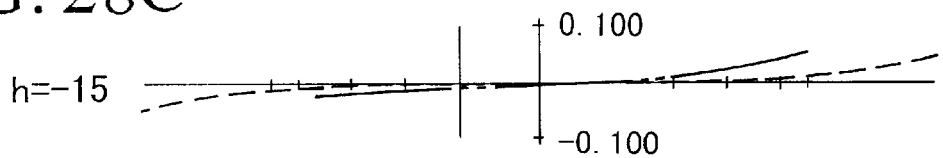

Hereinafter, preferred embodiments of the invention will be described in detail with reference to the drawings.

FIGS. 1A to 1C, FIGS. 8A to 8C, FIGS. 15A to 15C, and FIGS. 22A to 22C in lens block diagram show numerical examples 1 to 4 of embodiments of the invention, respectively, with FIGS. 1A, 8A, 15A and 22A in the wide-angle end, FIGS. 1B, 8B, 15B and 22B in a middle focal length position and FIGS. 1C, 8C, 15C and 22C in the telephoto end.

FIGS. 2A to 2E through FIGS. 4A to 4E show the aberrations of the numerical example 1 of the invention in the wide-angle, the middle focal length position and the telephoto end, respectively, in the normal state. FIGS. 7E to 7C through FIGS. 7A to 7E show the aberrations of the numerical example 1 of the invention in the wide-angle, the middle focal length position and the telephoto end, respectively, in the vibration compensating state.

FIGS. 9A to 9E through FIGS. 11A to 11E show the aberrations of the numerical example 2 of the invention in the wide-angle, the middle focal length position and the telephoto end, respectively, in the normal state. FIGS. 14E to 14C through FIGS. 14A to 14E show the aberrations of the numerical example 2 of the invention in the wide-angle, the middle focal length position and the telephoto end, respectively, in the vibration compensating state.

FIGS. 16A to 16E through FIGS. 18A to 18E show the aberrations of the numerical example 3 of the invention in the wide-angle, the middle focal length position and the telephoto end, respectively, in the normal state. FIGS. 19A to 19C through FIGS. 21A to 21C show the aberrations of the numerical example 3 of the invention in the wide-angle, the middle focal length position and the telephoto end, respectively, in the vibration compensating state.

FIGS. 23A to 23E through FIGS. 25A to 25E show the aberrations of the numerical example 4 of the invention in the wide-angle, the middle focal length position and the telephoto end, respectively, in the normal state. FIGS. 26A to 26C through FIGS. 28A to 28C show the aberrations of the numerical example 4 of the invention in the wide-angle, the middle focal length position and the telephoto end, respectively, in the vibration compensating state.

In FIGS. 1A, 8A, 15A and 22A, the zoom lens comprises, in order from an object side to an image side, a first lens unit L1 of negative refractive power, a second lens unit L2 of positive refractive power, a third lens unit L3 of positive refractive power, and a fourth lens unit L4 which has a positive refractive power in the numerical examples 1, 2 and 3, or a negative refractive power in the numerical example 4.

During zooming from the wide-angle end to the telephoto end, as indicated by the arrows in FIGS. 1A, 8A, 15A and 22A, the first lens unit L1 axially moves while depicting a locus convex toward the image side. At the same time, the second lens unit L2 and the third lens unit L3 axially move toward the object side either in unison or in differential relation. The fourth lens unit L4 remains stationary during zooming.

In the present embodiment, the third lens unit L3 is made to move in directions perpendicular to the optical axis to compensate for shaking of a photographed image when the zoom lens vibrated (tilts). An aperture stop SP is located behind the second lens unit L2 and is arranged to move together with the second lens unit L2 during zooming.

A moving stop MP is provided in between the third lens unit L3 and the fourth lens unit L4 and is made to axially move toward the object side independently during zooming from the wide-angle end to the telephoto end to cut off the flare due to harmful light produced in a region of from the middle focal length position to the telephoto end. IP stands for an image plane.

The fourth lens unit L4 includes at least one positive lens and at least one negative lens and has at least one aspheric surface. With this arrangement, all aberrations are corrected well.

The zoom lens having the vibration compensating function in the present embodiment varies the view angle from about 75° in the wide-angle end to about 30° in the telephoto end. So, the zoom ratio is 3 weak. As is apparent from the graphs of aberrations, good stability of correction of all aberrations is maintained throughout the entire zooming range in the vibration compensating state as well as in the normal state.

Also, for a certain angle of tilt, the radial distance the lens unit for compensating for vibrations is required to move is made short enough as its value is cited together with the data for the numerical examples to be described later. This feature assures realization of a compact form of the apparatus. Incidentally, the aberration curves are shown only with an object at infinity. In the present embodiment, the first lens unit L1 is made to move axially forward as the object distance decreases. This focusing arrangement assures good optical performance to be obtained even during close-up photography.

In the present embodiment, as can be seen from the lens block diagrams, the negative-lead type that has a relatively small number of lens units to move is selected to be used in the standard zoom lens. Of the lens units constituting this zoom lens, the one which is relatively small in the diameter and, in the vibration compensating state, provides a highest possibility of correcting well all decentering aberrations is found to be the third lens unit, which is made to shift in directions approximately perpendicular to the optical axis to compensate for vibrations.

The basic configuration of the negative-lead type standard zoom lens has a lens unit of negative refractive power and a lens unit of positive refractive power arranged in this order from the object side. During zooming from the wide-angle end to the telephoto end, these two lens units move along a common optical axis, while decreasing the separation therebetween to keep the constant position of an image plane. This is just the 2-unit zoom lens. It is to be noted here that the front or negative lens unit has a reciprocating locus during zooming in order to insure that the physical length of the optical system is limited to a minimum.

The rear or positive lens unit is divided into two parts, or a positive second lens unit and a positive third lens unit, with an appropriate refractive power distribution over them. Then, the third lens unit is made to move in directions approximately perpendicular to the optical axis to compensate for vibrations.

The negative-lead type standard zoom lens of such a basic configuration is then added, on the image side thereof, with a fixed fourth lens unit which facilitates the aberration correction, thus correcting all aberrations well. By this fourth lens unit, those aberrations which result from the asymmetry of the entire optical system, mainly coma, are corrected well.

A zoom lens having the vibration compensating function in the present embodiment is thus composed of, in order from an object side, a first lens unit of negative refractive power, a second lens unit of positive refractive power, a third lens unit of positive refractive power and a forth lens unit of positive or negative refractive power. With the use of these four lens units, a negative-lead type standard zoom lens is constructed, part of which, the third lens unit, is selected to be used for compensating for vibrations as it moves in directions approximately perpendicular to the optical axis.

The present embodiment further includes an aperture stop positioned in the rear neighborhood of the second lens unit. This arrangement produces advantages, in particular, of reducing the diameter of the third lens unit that moves in directions approximately perpendicular to the optical axis to compensate for vibrations. Such reduction is reflected to realize the apparatus in a more compact form.

The features described above suffice for accomplishing the object of the invention. To further improve the compact form of the whole optical system in such a manner as to keep good optical performance, it is preferable that the zoom lens having the vibration compensating function satisfies at least one of the following features or conditions.

[A1] Letting the focal lengths in the wide-angle end and the telephoto end of the entire lens system be denoted by fW and fT, respectively, the overall focal lengths in the wide-angle end and the telephoto end of the first and second lens units be denoted by fFW and fFT, respectively, and the focal length of the third lens unit be denoted by f3, the following conditions are satisfied:

$$-0.2 < \sqrt{fW \cdot fT} / fFW < 1.0 \quad (1)$$

$$-1.0 < \sqrt{fW \cdot fT} / fFT < 0.2 \quad (2)$$

$$0.4 < \sqrt{fW \cdot fT} / f3 < 2.0 \quad (3)$$

The inequalities of conditions (1) and (2) give ranges for the ratios of the geometric means of the shortest and longest focal lengths to the overall focal lengths fFW and fFT of the first and second lens units in the wide-angle and telephoto ends, respectively. The inequalities of condition (3) give a range for the ratio of the geometric means of the shortest and longest focal lengths to the focal length f3 of the third lens unit.

By the conditions (1), (2) and (3), in the wide-angle and telephoto ends, appropriate power distributions are determined over the third lens unit that moves in the directions approximately perpendicular to the optical axis to compensate for vibrations and the lens units that lie on the object side of the third lens unit. With these conditions, the paraxial ray of light is made incident on, and emerges from, the third lens unit at appropriate angles of inclination.

The satisfaction of these conditions results also in a refractive power arrangement such that, as the third lens unit moves in the directions approximately perpendicular to the optical axis, the decentering sensitivity (a rate of the amount of shift of an image relative to the amount of movement of the lens unit) is kept high. Nonetheless, it is made relatively easy to correct the decentering aberrations. In such a manner it is made possible to simultaneously fulfill the requirements of reducing the required radial movement of the third lens unit by increasing the decentering sensitivity and of making it relatively easy to correct all decentering aberrations. The number of constituent lenses of each lens unit is thus made small enough to achieve further improvement of the compact form.

[A2] The fourth lens unit includes at least one positive lens and at least one negative lens, and, letting the focal length of the fourth lens unit be denoted by f4, and, as the focal length fT in the telephoto end of the entire lens system is normalized to "1", the Petzval sums of the third lens unit and the fourth lens unit be denoted by P3 and P4, respectively, the following conditions are satisfied:

$$-0.4 < \sqrt{fW \cdot fT} / f4 < 0.8 \quad (4)$$

$$0.5 < P3 < 2.0 \quad (5)$$

$$-0.4 < P4 < 0.8 \quad (6)$$

The inequalities of condition (4) give a range for the ratio of the geometric means of the shortest and longest focal lengths to the focal length f4 of the fourth lens unit. The inequalities of conditions (5) and (6) are concerned with the third and fourth lens units in respect to the Petzval sum itself.

In the present embodiment, on the assumption that the refractive power arrangement satisfies the conditions (1), (2) and (3), and under these additional conditions (4), (5) and (6), the refractive power of the fourth lens unit is made relatively weak, and the Petzval sum is taken at appropriate values, so that, when the third lens unit moves in the directions approximately perpendicular to the optical axis to compensate for vibrations, decentering field curvature is particularly corrected well.

[A3] As the focal length in the telephoto end of the entire lens system is normalized to "1", letting the spherical aberration coefficients of the first, second and third lens units be denoted by I1, I2 and I3, respectively, the following conditions are satisfied:

$$-2.0 < I1/I2 < -0.5 \quad (7)$$

$$-0.2 < I3/I2 < 0.6 \quad (8)$$

The inequalities of condition (7) are concerned with the first and second lens units and the inequalities of condition (8) are concerned with the second and third lens units, to determine the ratio of the values of the spherical aberration of these two lens units in the telephoto end. By the condition (7), the first and second lens units have their spherical aberration coefficients made to be of opposite sign and to take close absolute values. The optical system is thus constructed with these lens units combined having a small value.

By the condition (8), the third lens unit is formed to a considerably small value of the spherical aberration coefficient compared with that of the spherical aberration coefficient of the second lens unit. On design of an optical system, it is, of course, desirable that the optical system as a whole gets a small value of the spherical aberration coefficient. However, there is a degree of freedom that every lens unit can be made large or small in the spherical aberration coefficient independently of the others.

Utilizing this degree of freedom, these conditions are set forth for appropriate residual of spherical aberration of each lens unit. With this arrangement, although the lens elements are few in number, particularly, decentering coma is corrected well. It should be noted that the reason the these conditions are defined in terms of the telephoto end is on consideration of the fact that, as the displacement of the image is compensated for, an image in the paraxial zone tends to deteriorate more prominently when the decentering occurs in the telephoto end than when in the wide-angle end.

Although, in the numerical examples 1 to 4, the separation between the second and third lens units does not vary with zooming, a modification may be made by varying this separation. According to this arrangement, the stability of the correction of aberrations can be further improved over the entire zooming range.

If, as these lens units move in unison with zooming, their separation remains constant, this embodiment has an advantage that the operating mechanism becomes simpler in structure. Either of these embodiments is advantageous, provided the right one is chosen for the right aim.

It should pointed out that the second and third lens units arranged on zooming to move in unison may be considered to be one lens unit (taken as a new second lens unit.) That third lens unit movable for compensating for vibrations is then treated as part of the second lens unit.

In this case, the fourth lens unit is counted as a third lens unit. Therefore, the zoom lens in the present embodiment is regarded as comprising three lens units in total. The basic configuration of such a zoom lens has a first lens unit of negative refractive power, a second lens unit of positive refractive power and a third lens unit of positive or negative refractive power arranged in this order from the object side, in which, during zooming from the wide-angle end to the telephoto end, the first and second lens units move along the optical axis, and the third lens unit remains stationary. As the zoom lens vibrates, the shaking of a photographed image is compensated for by moving one lens unit as part of the second lens unit in directions approximately perpendicular to the optical axis.

[A4] The second lens unit L2 is composed of, in order from the object side, a positive lens having a convex surface facing the object side, a positive lens of meniscus form convex toward the object side, and a negative lens of meniscus form convex toward the object side. The third lens unit L 3 is a cemented lens composed of negative and positive lenses or positive and negative lenses. By this arrangement, a high optical performance is obtained throughout the entire zooming range.

[A5] The fourth lens unit includes, in order from the object side, a negative lens having a concave surface facing the object side and a positive lens having a convex surface facing the image side. By this arrangement, a high optical performance is obtained over the entire area of the image frame.

[A6] The first lens unit is composed of, in order from the object side, a positive lens, a negative lens of meniscus form convex toward the object side, a negative lens and a positive lens of meniscus form convex toward the object side. By this arrangement, a high optical performance is obtained over the entire area of the image frame.

It will be appreciated from the foregoing that the present embodiment utilizes the features of each of the lens units in the standard zoom lens of the negative-lead type and revises one of these lens units in an appropriate way to realize a zoom lens which is constructed in a relatively simple form, while still permitting the vibration compensating function to be performed with a higher efficiency.

Incidentally, explanation about the decentering aberrations produced when one lens unit constituting part of an optical system decenters in directions perpendicular to the optical axis is given in "Japanese journal of Optics" Vol. 24, No. 12 (December in 1995) issued by the Optical Society of Japan (the Japan Society of Applied Physics).

Suppose the optical system laterally decenters from a reference axis to a distance E, then an amount of decentering aberrations is produced on the image plane. For an object point at a view angle $\omega$, using the polar coordinates (R, $\phi$) in expressing a point at which a ray is incident on the entrance pupil, aberration components $\Delta Y(E)$ and $\Delta Z(E)$ on the image plane are given by the following expressions:

$$\Delta Y(E) = -(E/2\alpha')[(\Delta E) + \tan^2\omega\{3(VE1) - (VE2)\} + 2R\cos\phi\tan\omega\{3(IIIE) + (PE)\} + R^2(2 + \cos2\phi)(IIE)]$$

$$\Delta Z(E) = -(E/2\alpha')[2R\sin\phi\tan\omega\{3(IIIE) + (PE)\} + R^2\sin2\phi(IIE)]$$

Figure 29:
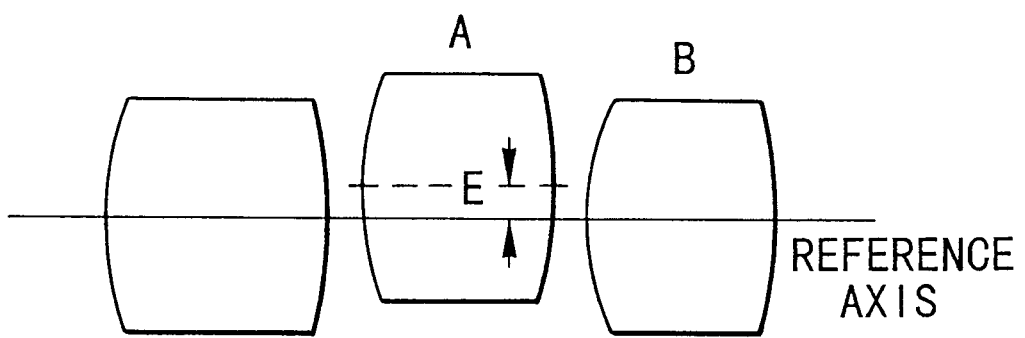
FIG. 29 is a schematic diagram to explain the aberrations of the optical system decentered in part.

The value $\alpha'$ on the left side of these equations represents the value of the paraxial ray from the object in the image space of the optical system, and ($\Delta E$), (VE1), (VE2), (IIIE), (PE) and (IIE) are the constants called the decentering aberration coefficients which are determined by the configuration of the optical system. These decentering aberration coefficients take values relevant to the decentering element in the optical system and those that follow. Parts disposed in front of the decentering element are not related thereto at all. So, as shown in FIG. 29, that part of the optical system which decenters is called the element A and a part behind it is called the element B. Then, the values of the decentering aberration coefficients are expressed by using the paraxial ray tracing before and after the element A and the values of the third-order aberration coefficients as follows. It is to be noted that, when tracing the paraxial ray, the parameters $\alpha_A$, $\alpha'_A$, $\overline{\alpha_A}$ and $\overline{\alpha'_A}$ are used, representing the angles the paraxial on-axial ray and the pupil paraxial ray make with the optical axis in the spaces before and after the decentering element, where the overlined parameter is concerned with the pupil paraxial ray.

$$(\Delta E) = -2(\alpha'_A - \alpha_A)$$

$$(VE1) = \{(\alpha'_A V_B - \alpha_A (V_A + V_B)\} - \{\overline{\alpha'_A} III_B - \overline{\alpha_A}(III_A + III_B)\}$$

$$(VE2) = \overline{\alpha'_A} P_B - \overline{\alpha_A}(P_A + P_B)$$

$$(IIIE) = \{\alpha'_A III_B - \alpha_A (III_A + III_B)\} - \{\overline{\alpha'_A} II_B - \overline{\alpha_A}(II_A + II_B)\}$$

$$(PE) = \alpha'_A P_B - \alpha_A (P_A + P_B)$$

$$(IIE) = \{\alpha'_A II_B - \alpha_A (II_A + II_B)\} - \{\overline{\alpha'_A} II_B - \overline{\alpha_A}(I_A + I_B)\}$$

where ($\Delta E$) is the displacement of the original point, and (VE1) is the coefficient of decentering distortion, (VE2) is the coefficient of decentering distortion added aberration, (IIIE) is the coefficient of decentering astigmatism, (PE) is the coefficient of decentering field curvature, and (IIE) is the coefficient of decentering coma.

The zoom lens having the vibration compensating function in the present embodiment is constructed by the features described above, so that the thus-characterized amount of decentering aberrations is corrected to a value small enough.

Next, the various dimensions of the four numerical examples 1 to 4 are shown. In the numerical data for the examples 1 to 4, ri is the radius of curvature of the i-th lens surface, when counted from the object side, di is the i-th lens thickness or air separation, when counted from the object side, ni and vi are respectively the refractive index and Abbe number of the material of the i-th lens element, when counted from the object side.

The values of the factors in the above-described conditions (1) to (8) for the numerical examples 1 to 4 are listed in Table-1.

The shape of an aspheric surface is expressed in the coordinates with an X axis in the axial direction and an Y axis in the direction perpendicular to the optical axis by the following equation:

$$X = \frac{(1/R)Y^2}{1 + \sqrt{1 - (Y/R)^2}} + BY^4 + CY^6 + DY^8 + EY^{10}$$

where R is the radius of the osculating sphere, and B, C, D and E are the aspheric coefficients. Also, notation "D-X" means "$\times 10^{-X}$".

[Numerical Example 1]

| f = 28.90~77.37 | | Fno = 3.3~5.8 | |
|---|---|---|---|
| r1 = 143.37 | d1 = 3.80 | n1 = 1.60311 | ν1 = 60.7 |
| r2 = -1223.08 | d2 = 0.20 | | |
| r3 = 74.35 | d3 = 1.50 | n2 = 1.80610 | ν2 = 41.0 |
| r4 = 19.28 | d4 = 9.20 | | |
| r5 = -347.13 | d5 = 1.30 | n3 = 1.71300 | ν3 = 53.8 |
| r6 = 40.29 | d6 = 0.20 | | |
| r7 = 29.00 | d7 = 5.10 | n4 = 1.80518 | ν4 = 25.4 |
| r8 = 128.02 | d8 = Variable | | |
| r9 = 32.92 | d9 = 3.00 | n5 = 1.77250 | ν5 = 49.6 |
| r10 = 875.99 | d10 = 0.20 | | |
| r11 = 14.97 | d11 = 3.50 | n6 = 1.80610 | ν6 = 41.0 |
| r12 = 32.28 | d12 = 1.30 | | |
| r13 = 50.11 | d13 = 1.30 | n7 = 1.80518 | ν7 = 25.4 |
| r14 = 11.87 | d14 = 3.50 | | |
| r15 = Stop | d15 = Variable | | |
| r16 = 38.50 | d16 = 1.00 | n8 = 1.76182 | ν8 = 26.5 |
| r17 = 19.03 | d17 = 2.80 | n9 = 1.60562 | ν9 = 43.7 |
| r18 = -114.07 | d18 = Variable | | |
| r19 = Stop | d19 = Variable | | |
| r20 = -43.56 | d20 = 1.30 | n10 = 1.83400 | ν10 = 37.2 |
| r21 = 77.98 | d21 = 1.50 | | ν11 = 38.0 |
| *r22 = 58.24 | d22 = 7.00 | n11 = 1.60342 | |
| r23 = -29.05 | | | |

| Variable | Focal Length | | |
|---|---|---|---|
| Separation | 28.90 | 50.00 | 77.37 |
| d8 | 32.50 | 11.58 | 1.44 |
| d15 | 0.50 | 0.50 | 0.50 |
| d18 | 1.00 | 8.49 | 21.50 |
| d19 | 2.50 | 12.64 | 22.50 |

Aspheric Coefficients for r22:
B: -8.395D-06
C: 2.510D-08
D: -9.796D-11
E: 1.624D-13
*) Aspheric Surface For 1° to compensate, the lens unit moves a distance of:
 -0.686 in the wide-angle end;
 -0.855 in the middle focal length position; and
 -0.970 in the telephoto end.

[Numerical Example 2]

| f = 28.79~77.20 | | Fno = 3.3~5.8 | |
|---|---|---|---|
| r1 = 91.78 | d1 = 4.70 | n1 = 1.51633 | ν1 = 64.2 |
| r2 = 19196.25 | d2 = 0.20 | | |
| r3 = 77.73 | d3 = 1.50 | n2 = 1.80610 | ν2 = 41.0 |
| r4 = 19.15 | d4 = 9.50 | | |
| r5 = -117.62 | d5 = 1.30 | n3 = 1.62299 | ν3 = 58.2 |
| r6 = 53.44 | d6 = 0.20 | | |
| r7 = 30.49 | d7 = 4.30 | n4 = 1.76182 | ν4 = 26.5 |
| r8 = 101.37 | d8 = Variable | | |
| r9 = 17.82 | d9 = 3.00 | n5 = 1.69680 | ν5 = 55.5 |
| r10 = 36.69 | d10 = 0.20 | | |
| r11 = 18.53 | d11 = 3.50 | n6 = 1.83400 | ν6 = 37.2 |
| r12 = 28.54 | d12 = 1.30 | | |
| r13 = 35.25 | d13 = 1.20 | n7 = 1.80518 | ν7 = 25.4 |
| *r14 = 14.11 | d14 = 3.50 | | |
| r15 = Stop | d15 = Variable | | |
| r16 = 30.85 | d16 = 1.00 | n8 = 1.69895 | ν8 = 30.1 |
| r17 = 13.31 | d17 = 4.00 | n9 = 1.60562 | ν9 = 43.7 |
| r18 = -101.25 | d18 = Variable | | |
| r19 = Stop | d19 = Variable | | |
| r20 = -254.35 | d20 = 1.30 | n10 = 1.83400 | ν10 = 37.2 |
| r21 = 45.73 | d21 = 1.00 | | |
| r22 = 56.22 | d22 = 4.70 | n11 = 1.57501 | ν11 = 41.5 |
| r23 = -58.55 | | | |

| Variable | Focal Length | | |
|---|---|---|---|
| Separation | 28.79 | 50.00 | 77.20 |
| d8 | 34.00 | 11.86 | 1.27 |
| d15 | 0.50 | 0.50 | 0.50 |
| d18 | 1.50 | 7.77 | 18.04 |
| d19 | 2.00 | 11.77 | 22.08 |

Aspheric Coefficients for r14:
B: 3.150D-05
C: 1.420D-07
D: 5.452D-10
E: 1.628D-11
*) Aspheric Surface For 1° to compensate, the lens unit moves a distance of:
 -0.499 in the wide-angle end;
 -0.632 in the middle focal length position; and
 -0.725 in the telephoto end.

[Numerical Example 3]

| f = 28.96~77.29 | | Fno = 3.3~5.8 | |
|---|---|---|---|
| r1 = 110.17 | d1 = 4.17 | n1 = 1.51633 | ν1 = 64.2 |
| r2 = -2117.13 | d2 = 0.20 | | |
| r3 = 103.76 | d3 = 1.50 | n2 = 1.80610 | ν2 = 41.0 |
| r4 = 20.14 | d4 = 8.75 | | |
| r5 = -266.51 | d5 = 1.30 | n3 = 1.71300 | ν3 = 53.8 |
| r6 = 43.70 | d6 = 0.20 | | |
| r7 = 30.26 | d7 = 5.17 | n4 = 1.76182 | ν4 = 26.5 |
| r8 = 218.91 | d8 = Variable | | |
| r9 = 32.16 | d9 = 3.00 | n5 = 1.77250 | ν5 = 49.6 |
| r10 = -4632.05 | d10 = 0.20 | | |
| r11 = 15.67 | d11 = 3.50 | n6 = 1.80610 | ν6 = 41.0 |
| r12 = 31.54 | d12 = 1.30 | | |
| r13 = 54.37 | d13 = 1.74 | n7 = 1.80518 | ν7 = 25.4 |
| *r14 = 12.30 | d14 = 3.50 | | |
| r15 = Stop | d15 = Variable | | |
| r16 = 63.66 | d16 = 3.40 | n8 = 1.60562 | ν8 = 43.7 |
| r17 = -23.04 | d17 = 1.65 | n9 = 1.76182 | ν9 = 26.5 |
| r18 = -54.00 | d18 = Variable | | |
| r19 = Stop | d19 = Variable | | |
| r20 = -36.17 | d20 = 1.30 | n10 = 1.83400 | ν10 = 37.2 |
| r21 = 220.37 | d21 = 5.96 | n11 = 1.60342 | ν11 = 38.0 |
| r22 = -24.12 | | | |

| Variable | Focal Length | | |
|---|---|---|---|
| Separation | 28.96 | 50.00 | 77.29 |
| d8 | 33.12 | 11.58 | 1.11 |
| d15 | 0.50 | 0.50 | 0.50 |
| d18 | 0.50 | 5.92 | 20.90 |
| d19 | 3.00 | 15.16 | 23.00 |

Aspheric Coefficients for r20:
B: -6.408D-06
C: 3.942D-09
D: -5.969D-11
E: 1.461D-13
*) Aspheric Surface For 1° to compensate, the lens unit moves a distance of:
 -0.703 in the wide-angle end;
 -0.870 in the middle focal length position; and
 -0.984 in the telephoto end.

[Numerical Example 4]

| f = 29.06~77.23 | | Fno = 3.4~5.8 | |
|---|---|---|---|
| r1 = 57.34 | d1 = 1.50 | n1 = 1.80610 | v1 = 41.0 |
| r2 = 19.73 | d2 = 9.09 | | |
| r3 = 908.73 | d3 = 1.30 | n2 = 1.71300 | v2 = 53.8 |
| *r4 = 41.87 | d4 = 0.20 | | |
| r5 = 31.66 | d5 = 5.10 | n3 = 1.76182 | v3 = 26.5 |
| r6 = 175.18 | d6 = Variable | | |
| r7 = 33.01 | d7 = 3.00 | n4 = 1.77250 | v4 = 49.6 |
| r8 = −10140.21 | d8 = 0.20 | | |
| r9 = 16.64 | d9 = 3.50 | n5 = 1.80610 | v5 = 41.0 |
| r10 = 35.32 | d10 = 1.30 | | |
| r11 = 69.48 | d11 = 2.53 | n6 = 1.80518 | v6 = 25.4 |
| r12 = 12.90 | d12 = 3.50 | | |
| r13 = Stop | d13 = Variable | | |
| r14 = 65.28 | d14 = 3.40 | n7 = 1.60562 | v7 = 43.7 |
| *r15 = −22.90 | d15 = 1.51 | n8 = 1.76182 | v8 = 26.5 |
| r16 = −52.60 | d16 = Variable | | |
| r17 = Stop | d17 = Variable | | |
| r18 = −36.55 | d18 = 1.30 | n9 = 1.83400 | v9 = 37.2 |
| r19 = −4131.82 | d19 = 5.69 | n10 = 1.60342 | v10 = 38.0 |
| *r20 = −24.97 | | | |

| Variable | | Focal Length | |
|---|---|---|---|
| Separation | 29.06 | 50.00 | 77.23 |
| d6 | 34.93 | 12.18 | 1.05 |
| d13 | 0.50 | 0.50 | 0.50 |
| d16 | 0.50 | 7.85 | 20.98 |
| d17 | 3.00 | 13.25 | 23.00 |

Aspheric Coefficients for r4:
B: −3.672D-06
C: −6.692D-09
D: 1.665D-11
E: −9.108D-14
Aspheric Coefficients for r20:
B: 5.944D-06
C: −5.897D-09
D: 9.551D-11
E: −1.921D-13
*) Aspheric Surface For 1° to compensate, the lens unit moves a distance of:
 −0.703 in the wide-angle end;
 −0.871 in the middle focal length position; and
 −0.985 in the telephoto end.

TABLE 1

| | Numerical Example | | | |
|---|---|---|---|---|
| Condition | 1 | 2 | 3 | 4 |
| (1) (fW.fT)$^{1/2}$/fFW | 0.375 | 0.124 | 0.412 | 0.380 |
| (2) (fW.fT)$^{1/2}$/fFT | −0.261 | −0.473 | −0.245 | −0.254 |
| (3) (fW.fT)$^{1/2}$/f3 | 0.795 | 1.009 | 0.788 | 0.793 |
| (4) (fW.fT)$^{1/2}$/f4 | 0.222 | −0.033 | 0.168 | 0.177 |
| (5) P3 | 0.9 | 1.119 | 0.892 | 0.895 |
| (6) P4 | 0.246 | 0.077 | 0.207 | 0.204 |
| (7) I1/I2 | −0.955 | −1.187 | −0.973 | −1.103 |
| (8) I3/I2 | 0.014 | 0.200 | 0.053 | 0.113 |

It will be appreciated from the foregoing that the zoom lens, when vibrating or tilting, moves in part to compensate for the shaking of an image. For the refractive powers of the lens units and the power distribution, appropriate rules of design are set forth to maintain good stability of optical performance throughout the entire zooming range despite the construction in a relatively simple form. It is, therefore, made possible to achieve a zoom lens having the vibration compensating function which, even when equipped with a mechanism for compensating for vibrations, enables the whole apparatus to be minimized in bulk and size, and even when compensating for vibrations, keeps the image in good quality.

I claim:

1. A zoom lens having a vibration compensating function, comprising, in order from an object side to an image side:
 a first lens unit having a negative refractive power, said first lens unit moving along an optical axis during variation of magnification;
 a second lens unit having a positive refractive power, said second lens unit moving along the optical axis during variation of magnification;
 a third lens unit having a positive refractive power, said third lens unit moving along the optical axis during variation of magnification; and
 a fourth lens unit, said fourth lens unit being stationary during variation of magnification,
 wherein, when said zoom lens vibrates, said third lens unit is made to make a movement having at least a vector component which is perpendicular to the optical axis to compensate for shaking of an image.

2. A zoom lens according to claim 1, further comprising an aperture stop disposed on the image side of said second lens unit.

3. A zoom lens according to claim 1, satisfying the following conditions:

$$-0.2 < \sqrt{fW \cdot fT} / fFW < 1.0$$

$$-1.0 < \sqrt{fW \cdot fT} / fFT < 0.2$$

$$0.4 < \sqrt{fW \cdot fT} / f3 < 2.0$$

where fW and fT are focal lengths in a wide-angle end a telephoto end of said zoom lens, respectively, fFW and fFT are overall focal lengths in the wide-angle end and the telephoto end of said first and second lens units, respectively, and f3 is a focal length of said third lens unit.

4. A zoom lens according to claim 1, satisfying the following conditions:

$$-0.4 < \sqrt{fW \cdot fT} / f4 < 0.8$$

$$0.5 < P3 < 2.0$$

$$-0.4 < P4 < 0.8$$

where fW and fT are focal lengths in a wide-angle end a telephoto end of said zoom lens, respectively, f4 is a focal length of said fourth lens unit, and, as the focal length fT in the telephoto end of said zoom lens is normalized to "1", P3 and P4 are Petzval sums of said third lens unit and said fourth lens unit, respectively.

5. A zoom lens according to claim 1, satisfying the following conditions:

$$-2.0 < I1/I2 < -0.5$$

$$-0.2 < I3/I2 < 0.6$$

where, as a focal length in a telephoto end of said zoom lens is normalized to "1", I1, I2 and I3 are spherical aberration coefficients of said first lens unit, said second lens unit and said third lens unit, respectively.

6. A zoom lens according to claim 1, wherein said second lens unit and said third lens unit move in unison during variation of magnification.

7. A zoom lens according to claim 1, further comprising a moving stop disposed on the image side of said third lens unit, said moving stop moving independently of said first to fourth lens units during variation of magnification.

8. A zoom lens according to claim 1, wherein said first lens unit consists of, in order from the object side to the image side, a positive lens, a negative lens of meniscus form convex toward the object side, a negative lens, and a positive lens of meniscus form convex toward the object side.

9. A zoom lens according to claim 1, wherein said first lens unit consists of, in order from the object side to the image side, a negative lens of meniscus form convex toward the object side, and a positive lens of meniscus form convex toward the object side.

10. A zoom lens according to claim 1, wherein said second lens unit consists of, in order from the object side to the image side, a positive lens having a convex surface facing the object side, a positive lens of meniscus form convex toward the object side, and a negative lens of meniscus form convex toward the object side.

11. A zoom lens according to claim 1, wherein said third lens unit consists of a cemented lens composed of positive and negative lenses.

12. A zoom lens according to claim 1, wherein said fourth lens unit consists of, in order from the object side to the image side, a negative lens having a concave surface facing the object side and a positive lens having a convex surface facing the image side.

13. A zoom lens having a vibration compensating function, comprising, in order from an object side to an image side:

a first lens unit having a negative refractive power, said first lens unit moving along an optical axis during variation of magnification;

a second lens unit having a positive refractive power, said second lens unit moving along the optical axis during variation of magnification; and a third lens unit, said third lens unit being stationary during variation of magnification, wherein, when said zoom lens vibrates, a part of said second lens unit is made to make a movement having at least a vector component which is perpendicular to the optical axis to compensate for shaking of an image.

14. A photographing apparatus comprising:

a zoom lens according to one of claims 1 to 13.

* * * * *

UNITED STATES PATENT AND TRADEMARK OFFICE
CERTIFICATE OF CORRECTION

PATENT NO. : 5,991,091

DATED : November 23, 1999

INVENTOR(S) : SHINGO HAYAKAWA

It is certified that error appears in the above-identified patent and that said Letters Patent is hereby corrected as shown below:

COLUMN 1
Line 10, "of" should be deleted; and
Line 30, "complicate" should read --complicated--.

COLUMN 5
Line 51, "vibrated" should read --vibrates--.

COLUMN 6
Line 56, "forth" should read --fourth--.

COLUMN 8
Line 51, "the these" should read --that these--.

COLUMN 9
Line 1, "should" should read --should be--.

UNITED STATES PATENT AND TRADEMARK OFFICE
CERTIFICATE OF CORRECTION

PATENT NO. : 5,991,091

DATED : November 23, 1999

INVENTOR(S) : SHINDO HAYAKAWA

It is certified that error appears in the above-identified patent and that said Letters Patent is hereby corrected as shown below:

<u>COLUMN 10</u>
Line 5, "left" should read --right--.

<u>COLUMN 13</u>
Line 47, "(fW.fT)" should read --(fW·fT)--;
Line 48, "(fW.fT)½" should read --(fW·fT)$^{½}$--;
Line 49, "(fW.fT)½" should read --(fW·fT)$^{½}$--; and
Line 50, "(fW.fT)½" should read --(fW·fT)$^{½}$--.

UNITED STATES PATENT AND TRADEMARK OFFICE
CERTIFICATE OF CORRECTION

PATENT NO. : 5,991,091

DATED : November 23, 1999

INVENTOR(S) : SHINDO HAYAKAWA

It is certified that error appears in the above-identified patent and that said Letters Patent is hereby corrected as shown below:

<u>COLUMN 14</u>
Line 32, "end a" should read --end and a--; and
Line 46, "end a" should read --end and a--.

Signed and Sealed this

Twenty-eighth Day of November, 2000

Attest:

Q. TODD DICKINSON

*Attesting Officer*  *Director of Patents and Trademarks*